US009749276B2

(12) United States Patent
Isaacs et al.

(10) Patent No.: US 9,749,276 B2
(45) Date of Patent: *Aug. 29, 2017

(54) SYSTEM AND METHOD FOR ANALYZING COMMUNICATIONS

(71) Applicant: Facebook, Inc., Menlo Park, CA (US)

(72) Inventors: Ellen Isaacs, Belmont, CA (US); Bonnie A. Nardi, Mountain View, CA (US); Stephen Whittaker, Morristown, NJ (US)

(73) Assignee: FACEBOOK, INC., Menlo Park, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 14/327,183

(22) Filed: Jul. 9, 2014

(65) Prior Publication Data

US 2014/0324855 A1    Oct. 30, 2014

Related U.S. Application Data

(63) Continuation of application No. 14/323,601, filed on Jul. 3, 2014, which is a continuation of application
(Continued)

(51) Int. Cl.
*H04L 12/58* (2006.01)
*G06Q 10/10* (2012.01)
*G06F 17/30* (2006.01)

(52) U.S. Cl.
CPC .......... *H04L 51/22* (2013.01); *G06F 17/3053* (2013.01); *G06F 17/30572* (2013.01);
(Continued)

(58) Field of Classification Search
CPC ................. H04L 51/22; H04L 51/26
See application file for complete search history.

(56) References Cited

U.S. PATENT DOCUMENTS

| 4,323,987 A | 4/1982 | Holtz et al. |
| 4,365,293 A | 12/1982 | Holtz |

(Continued)

FOREIGN PATENT DOCUMENTS

| CN | 1348296 | 5/2002 |
| DE | 10048653 | 4/2002 |

(Continued)

OTHER PUBLICATIONS

"About Internet directory services," Outlook 2000 SR-l(9.0.0.4527) Help File, on or before Aug. 10, 2001, p. 1.
(Continued)

*Primary Examiner* — Jimmy H Tran
(74) *Attorney, Agent, or Firm* — Keller Jolley Preece

(57) ABSTRACT

The invention provides a system and method for analyzing a collection of communication messages. The communication messages may be any one of a collection of electronic mail messages, voicemail messages, instant messaging dialogs and other forms of communications. The collections of communications, such as electronic mail messages, may be selected by a user and then subsequently processed to determine the identity of any of the user's contacts within the communications. The contacts may then be arranged in a relative priority arrangement whereby contacts which have been identified as engaging in prior reciprocal communications with the user are given higher priority. Higher priority may also be given to contacts which engage in more recent communications with the user. Specific contact relationships may be inferred from the communications depending on whether specific contacts are repeatedly mentioned within the communication messages.

21 Claims, 16 Drawing Sheets

Related U.S. Application Data

No. 12/290,827, filed on Nov. 4, 2008, now Pat. No. 9,185,067, which is a continuation of application No. 10/979,960, filed on Nov. 3, 2004, now Pat. No. 7,454,470, which is a continuation of application No. 09/726,912, filed on Nov. 30, 2000, now Pat. No. 6,832,245.

(60) Provisional application No. 60/168,242, filed on Dec. 1, 1999.

(52) U.S. Cl.
CPC .. *G06F 17/30595* (2013.01); *G06F 17/30876* (2013.01); *G06Q 10/107* (2013.01); *H04L 51/26* (2013.01)

(56) References Cited

U.S. PATENT DOCUMENTS

| | | | |
|---|---|---|---|
| 4,517,561 A | 5/1985 | Burke et al. | |
| 4,837,798 A | 6/1989 | Cohen et al. | |
| 4,860,339 A * | 8/1989 | D'Agosto, III | H04M 1/2472 369/29.01 |
| 5,086,394 A | 2/1992 | Shapira | |
| 5,251,248 A | 10/1993 | Tokunaga et al. | |
| 5,276,905 A | 1/1994 | Hurst et al. | |
| 5,327,486 A | 7/1994 | Wolff et al. | |
| 5,377,354 A * | 12/1994 | Scannell | H04L 51/22 706/45 |
| 5,548,637 A | 8/1996 | Heller et al. | |
| 5,553,110 A | 9/1996 | Sentoku et al. | |
| 5,557,659 A | 9/1996 | Hyde-Thomson | |
| 5,583,920 A | 12/1996 | Wheeler, Jr. | |
| 5,608,786 A | 3/1997 | Gordon | |
| 5,610,910 A | 3/1997 | Focsaneanu et al. | |
| 5,650,994 A | 7/1997 | Daley | |
| 5,694,616 A * | 12/1997 | Johnson | G06Q 10/107 709/207 |
| 5,721,906 A | 2/1998 | Siefert | |
| 5,724,410 A * | 3/1998 | Parvulescu | G08B 3/1033 340/313 |
| 5,742,905 A | 4/1998 | Pepe et al. | |
| 5,764,916 A | 6/1998 | Busey et al. | |
| 5,774,670 A | 6/1998 | Montulli | |
| 5,790,800 A | 8/1998 | Gauvin et al. | |
| 5,793,365 A | 8/1998 | Tang et al. | |
| 5,802,470 A | 9/1998 | Gaulke et al. | |
| 5,806,692 A | 9/1998 | Pepper | |
| 5,812,770 A | 9/1998 | Sakai | |
| 5,831,611 A | 11/1998 | Kennedy et al. | |
| 5,835,724 A | 11/1998 | Smith | |
| 5,848,134 A | 12/1998 | Sekiguchi et al. | |
| 5,850,594 A | 12/1998 | Cannon et al. | |
| 5,859,979 A | 1/1999 | Tung et al. | |
| 5,867,162 A | 2/1999 | O'Leary et al. | |
| 5,870,744 A | 2/1999 | Sprague | |
| 5,872,521 A | 2/1999 | Lopatukin et al. | |
| 5,878,219 A | 3/1999 | Vance, Jr. et al. | |
| 5,889,799 A * | 3/1999 | Grossman | H04M 3/36 379/266.08 |
| 5,893,091 A | 4/1999 | Hunt et al. | |
| 5,893,099 A | 4/1999 | Schreiber et al. | |
| 5,919,247 A | 7/1999 | Van Hoff et al. | |
| 5,920,692 A | 7/1999 | Nguyen et al. | |
| 5,940,488 A | 8/1999 | DeGrazia et al. | |
| 5,946,617 A | 8/1999 | Portaro et al. | |
| 5,948,058 A | 9/1999 | Kudoh et al. | |
| 5,950,193 A | 9/1999 | Kulkarni | |
| 5,951,643 A | 9/1999 | Shelton et al. | |
| 5,951,646 A | 9/1999 | Brandon | |
| 5,951,652 A | 9/1999 | Ingrassia, Jr. et al. | |
| 5,954,798 A | 9/1999 | Shelton et al. | |
| 5,956,716 A | 9/1999 | Kenner et al. | |
| 5,960,173 A | 9/1999 | Tang et al. | |
| 5,966,714 A | 10/1999 | Huang et al. | |
| 5,983,369 A | 11/1999 | Bakoglu et al. | |
| 5,987,113 A | 11/1999 | James | |
| 5,987,407 A | 11/1999 | Wu et al. | |
| 5,991,791 A | 11/1999 | Siefert | |
| 5,995,023 A | 11/1999 | Kreft | |
| 6,002,402 A | 12/1999 | Schacher | |
| 6,006,179 A | 12/1999 | Wu et al. | |
| 6,006,215 A | 12/1999 | Retallick | |
| 6,009,413 A | 12/1999 | Webber et al. | |
| 6,012,051 A | 1/2000 | Sammon, Jr. et al. | |
| 6,014,135 A | 1/2000 | Fernandes | |
| 6,014,638 A | 1/2000 | Burge et al. | |
| 6,023,723 A * | 2/2000 | McCormick | G06Q 10/107 707/999.001 |
| 6,026,403 A | 2/2000 | Siefert | |
| 6,026,429 A | 2/2000 | Jones et al. | |
| 6,049,533 A | 4/2000 | Norman et al. | |
| 6,052,709 A | 4/2000 | Paul | |
| 6,065,047 A | 5/2000 | Carpenter et al. | |
| 6,070,171 A | 5/2000 | Snyder et al. | |
| 6,073,138 A | 6/2000 | de l'Etraz et al. | |
| 6,081,830 A | 6/2000 | Schindler | |
| 6,085,223 A | 7/2000 | Carino, Jr. et al. | |
| 6,088,435 A | 7/2000 | Barber et al. | |
| 6,108,691 A | 8/2000 | Lee et al. | |
| 6,112,181 A | 8/2000 | Shear et al. | |
| 6,119,114 A * | 9/2000 | Smadja | G06F 17/30011 |
| 6,134,432 A | 10/2000 | Holmes et al. | |
| 6,144,934 A | 11/2000 | Stockwell et al. | |
| 6,144,991 A | 11/2000 | England | |
| 6,151,584 A | 11/2000 | Papiernak et al. | |
| 6,161,130 A | 12/2000 | Horvitz et al. | |
| 6,166,730 A | 12/2000 | Goode et al. | |
| 6,175,831 B1 | 1/2001 | Weinreich et al. | |
| 6,182,227 B1 | 1/2001 | Blair et al. | |
| 6,192,395 B1 | 2/2001 | Lerner et al. | |
| 6,195,354 B1 | 2/2001 | Skalecki et al. | |
| 6,199,102 B1 | 3/2001 | Cobb | |
| 6,199,103 B1 | 3/2001 | Sakaguchi et al. | |
| 6,202,058 B1 | 3/2001 | Rose et al. | |
| 6,212,548 B1 | 4/2001 | DeSimone et al. | |
| 6,212,550 B1 | 4/2001 | Segur | |
| 6,223,213 B1 | 4/2001 | Cleron et al. | |
| 6,226,372 B1 | 5/2001 | Beebe et al. | |
| 6,233,577 B1 | 5/2001 | Ramasubramani et al. | |
| 6,247,043 B1 * | 6/2001 | Bates | G06F 17/30699 707/E17.059 |
| 6,249,740 B1 | 6/2001 | Ito et al. | |
| 6,260,148 B1 | 7/2001 | Aggarwal et al. | |
| 6,269,369 B1 | 7/2001 | Robertson | |
| 6,301,609 B1 | 10/2001 | Aravamudan et al. | |
| 6,311,211 B1 | 10/2001 | Shaw et al. | |
| 6,314,420 B1 | 11/2001 | Lang et al. | |
| 6,314,450 B1 | 11/2001 | Hachiya et al. | |
| 6,317,776 B1 | 11/2001 | Broussard et al. | |
| 6,324,541 B1 | 11/2001 | De l'Etraz et al. | |
| 6,330,079 B1 * | 12/2001 | Dugan | H04N 1/32561 358/402 |
| 6,330,590 B1 | 12/2001 | Cotten | |
| 6,347,332 B1 | 2/2002 | Malet et al. | |
| 6,349,327 B1 | 2/2002 | Tang et al. | |
| 6,351,698 B1 | 2/2002 | Kubota et al. | |
| 6,351,764 B1 * | 2/2002 | Voticky | G06Q 10/107 709/206 |
| 6,363,392 B1 | 3/2002 | Halstead et al. | |
| 6,366,962 B1 | 4/2002 | Teibel | |
| 6,374,246 B1 | 4/2002 | Matsuo | |
| 6,374,259 B1 | 4/2002 | Celik | |
| 6,374,290 B1 | 4/2002 | Scharber et al. | |
| 6,389,127 B1 | 5/2002 | Vardi et al. | |
| 6,389,372 B1 | 5/2002 | Glance et al. | |
| 6,393,464 B1 | 5/2002 | Dieterman | |
| 6,396,513 B1 * | 5/2002 | Helfman | G06Q 10/107 709/206 |
| 6,400,381 B1 | 6/2002 | Barrett et al. | |
| 6,405,035 B1 | 6/2002 | Singh | |
| 6,405,249 B1 | 6/2002 | Matsuda et al. | |
| 6,415,318 B1 | 7/2002 | Aggarwal et al. | |

(56) References Cited

U.S. PATENT DOCUMENTS

| | | |
|---|---|---|
| 6,421,439 B1 | 7/2002 | Liffick |
| 6,421,675 B1 | 7/2002 | Ryan et al. |
| 6,421,709 B1 | 7/2002 | McCormick et al. |
| 6,425,012 B1 | 7/2002 | Trovato et al. |
| 6,430,344 B1 | 8/2002 | Dixon et al. |
| 6,430,604 B1 | 8/2002 | Ogle et al. |
| 6,446,112 B1 | 9/2002 | Bunney et al. |
| 6,449,344 B1 | 9/2002 | Goldfinger et al. |
| 6,449,634 B1 | 9/2002 | Capiel |
| 6,480,885 B1 | 11/2002 | Olivier |
| 6,484,196 B1 | 11/2002 | Maurille |
| 6,487,600 B1 * | 11/2002 | Lynch ............... H04L 29/06 709/204 |
| 6,499,021 B1 | 12/2002 | Abu-Hakima |
| 6,501,834 B1 | 12/2002 | Milewski et al. |
| 6,507,866 B1 | 1/2003 | Barchi |
| 6,525,747 B1 | 2/2003 | Bezos |
| 6,529,475 B1 | 3/2003 | Wan et al. |
| 6,535,586 B1 | 3/2003 | Cloutier et al. |
| 6,539,421 B1 | 3/2003 | Appelman et al. |
| 6,542,750 B2 | 4/2003 | Hendrey et al. |
| 6,546,417 B1 | 4/2003 | Baker |
| 6,549,937 B1 | 4/2003 | Auerbach et al. |
| 6,557,027 B1 | 4/2003 | Cragun |
| 6,559,863 B1 | 5/2003 | Megiddo |
| 6,564,248 B1 | 5/2003 | Budge et al. |
| 6,564,261 B1 | 5/2003 | Gudjonsson et al. |
| 6,571,234 B1 * | 5/2003 | Knight ............... G06Q 10/10 |
| 6,574,599 B1 | 6/2003 | Lim et al. |
| 6,580,790 B1 | 6/2003 | Henry et al. |
| 6,584,471 B1 | 6/2003 | Maclin et al. |
| 6,587,549 B1 | 7/2003 | Weik |
| 6,606,647 B2 | 8/2003 | Shah et al. |
| 6,615,241 B1 * | 9/2003 | Miller ............... G06Q 10/107 707/999.1 |
| 6,622,160 B1 * | 9/2003 | Horvitz ............ G06F 17/30707 709/206 |
| 6,625,258 B1 * | 9/2003 | Ram ............... H04L 12/5835 379/373.01 |
| 6,636,733 B1 | 10/2003 | Helferich |
| 6,636,850 B2 | 10/2003 | Lepien |
| 6,640,218 B1 | 10/2003 | Golding |
| 6,640,230 B1 | 10/2003 | Alexander et al. |
| 6,643,641 B1 | 11/2003 | Snyder |
| 6,647,383 B1 | 11/2003 | August |
| 6,654,683 B2 | 11/2003 | Jin et al. |
| 6,654,787 B1 * | 11/2003 | Aronson ............ H04L 12/585 707/999.003 |
| 6,654,791 B1 | 11/2003 | Bates et al. |
| 6,677,968 B1 | 1/2004 | Appelman |
| 6,677,976 B2 | 1/2004 | Parker et al. |
| 6,678,719 B1 | 1/2004 | Stimmel |
| 6,681,108 B1 | 1/2004 | Terry et al. |
| 6,691,162 B1 | 2/2004 | Wick |
| 6,697,807 B2 | 2/2004 | McGeachie |
| 6,701,348 B2 | 3/2004 | Sommerer |
| 6,708,205 B2 | 3/2004 | Sheldon et al. |
| 6,714,791 B2 | 3/2004 | Friedman |
| 6,714,793 B1 | 3/2004 | Carey et al. |
| 6,714,916 B1 | 3/2004 | Robertson et al. |
| 6,714,967 B1 | 3/2004 | Horvitz |
| 6,731,308 B1 | 5/2004 | Tang et al. |
| 6,732,155 B2 | 5/2004 | Meek |
| 6,738,822 B2 | 5/2004 | Fukasawa et al. |
| 6,745,230 B1 * | 6/2004 | Cao ............... G06Q 10/107 379/88.12 |
| 6,747,970 B1 | 6/2004 | Lamb et al. |
| 6,748,421 B1 | 6/2004 | Ozkan et al. |
| 6,750,881 B1 | 6/2004 | Appelman |
| 6,757,365 B1 | 6/2004 | Bogard |
| 6,757,732 B1 | 6/2004 | Sollee et al. |
| 6,772,188 B1 | 8/2004 | Cloutier |
| 6,779,022 B1 * | 8/2004 | Rothkopf ............ H04L 12/5855 709/206 |
| 6,781,608 B1 | 8/2004 | Crawford |
| 6,785,554 B1 | 8/2004 | Amerga |
| 6,785,681 B2 | 8/2004 | Keskar et al. |
| 6,788,769 B1 | 9/2004 | Waites |
| 6,795,863 B1 | 9/2004 | Doty |
| 6,799,039 B2 | 9/2004 | Wu et al. |
| 6,800,031 B2 | 10/2004 | Di Cesare |
| 6,807,574 B1 | 10/2004 | Partovi et al. |
| 6,816,578 B1 | 11/2004 | Kredo et al. |
| 6,821,851 B2 | 11/2004 | Hergenrother et al. |
| 6,832,245 B1 | 12/2004 | Isaacs |
| 6,839,735 B2 | 1/2005 | Wong et al. |
| 6,839,737 B1 | 1/2005 | Friskel |
| 6,857,006 B1 | 2/2005 | Nishizawa |
| 6,868,498 B1 | 3/2005 | Katsikas |
| 6,879,665 B1 | 4/2005 | Cook et al. |
| 6,895,426 B1 | 5/2005 | Cortright et al. |
| 6,901,559 B1 | 5/2005 | Blum et al. |
| 6,904,026 B1 | 6/2005 | Tarnanen et al. |
| 6,907,243 B1 | 6/2005 | Patel |
| 6,912,563 B1 | 6/2005 | Parker et al. |
| 6,912,564 B1 | 6/2005 | Appelman et al. |
| 6,917,610 B1 | 7/2005 | Kung et al. |
| 6,917,965 B2 | 7/2005 | Gupta et al. |
| 6,920,478 B2 | 7/2005 | Mendiola et al. |
| 6,940,955 B1 | 9/2005 | Jones et al. |
| 6,941,345 B1 | 9/2005 | Kapil |
| 6,968,179 B1 | 11/2005 | De Vries |
| 6,980,870 B1 | 12/2005 | Mok et al. |
| 6,990,513 B2 | 1/2006 | Belfiore et al. |
| 6,990,628 B1 | 1/2006 | Palmer et al. |
| 6,993,327 B2 | 1/2006 | Mathis |
| 6,993,564 B2 | 1/2006 | Whitten, II |
| 6,996,520 B2 | 2/2006 | Levin |
| 7,007,067 B1 * | 2/2006 | Azvine ............... G06F 3/011 709/202 |
| 7,035,865 B2 | 4/2006 | Doss et al. |
| 7,039,639 B2 | 5/2006 | Brezin |
| 7,039,676 B1 | 5/2006 | Day et al. |
| 7,043,530 B2 | 5/2006 | Isaacs et al. |
| 7,058,036 B1 | 6/2006 | Yu et al. |
| 7,058,690 B2 | 6/2006 | Maehiro |
| 7,065,186 B1 | 6/2006 | Myers et al. |
| 7,082,047 B2 | 7/2006 | Chow |
| 7,082,407 B1 | 7/2006 | Bezos et al. |
| 7,085,834 B2 | 8/2006 | Delany et al. |
| 7,117,254 B2 | 10/2006 | Lunt et al. |
| 7,120,687 B1 | 10/2006 | Tessman, Jr. et al. |
| 7,124,123 B1 | 10/2006 | Roskind et al. |
| 7,127,232 B2 | 10/2006 | O'Neil et al. |
| 7,133,898 B1 | 11/2006 | Malik |
| 7,143,091 B2 | 11/2006 | Charnock et al. |
| 7,162,202 B2 | 1/2007 | Westman |
| 7,167,910 B2 | 1/2007 | Farnham et al. |
| 7,171,473 B1 | 1/2007 | Eftis et al. |
| 7,177,880 B2 | 2/2007 | Ruvolo et al. |
| 7,181,498 B2 | 2/2007 | Zhu et al. |
| 7,185,059 B2 | 2/2007 | Daniell et al. |
| 7,188,143 B2 | 3/2007 | Szeto |
| 7,188,153 B2 | 3/2007 | Lunt et al. |
| 7,190,956 B2 | 3/2007 | Dorenbosch et al. |
| 7,200,634 B2 | 4/2007 | Mendiola et al. |
| 7,202,814 B2 | 4/2007 | Caspi et al. |
| 7,206,814 B2 | 4/2007 | Kirsch |
| 7,222,156 B2 | 5/2007 | Gupta et al. |
| 7,233,992 B1 | 6/2007 | Muldoon et al. |
| 7,263,614 B2 | 8/2007 | Roskind |
| 7,269,590 B2 | 9/2007 | Hull et al. |
| 7,275,215 B2 | 9/2007 | Werndorfer |
| 7,283,805 B2 | 10/2007 | Agrawal |
| 7,313,760 B2 | 12/2007 | Grossman et al. |
| 7,316,028 B2 | 1/2008 | Donatelli et al. |
| 7,403,942 B1 | 7/2008 | Bayliss |
| 7,436,780 B2 | 10/2008 | Stephens et al. |
| 7,437,413 B2 | 10/2008 | Okuyama et al. |
| 7,454,470 B1 | 11/2008 | Isaacs et al. |
| 7,475,113 B2 | 1/2009 | Stolze |
| 7,490,238 B2 | 2/2009 | Roskind |
| 7,519,717 B2 | 4/2009 | Stanford-Clark et al. |

(56) References Cited

U.S. PATENT DOCUMENTS

| | | |
|---|---|---|
| 7,561,682 B2 | 7/2009 | Doherty et al. |
| 7,596,386 B2 | 9/2009 | Yach et al. |
| 7,610,627 B1 | 10/2009 | McKenna |
| 7,680,886 B1 | 3/2010 | Cooley |
| 7,711,106 B2 | 5/2010 | Likwornik |
| 7,716,287 B2 | 5/2010 | Appelman |
| 7,774,711 B2 | 8/2010 | Valeski |
| 7,904,511 B2 | 3/2011 | Ryan et al. |
| 7,941,491 B2 | 5/2011 | Sood |
| 7,945,674 B2 | 5/2011 | Appelman |
| 7,949,759 B2 | 5/2011 | Appelman |
| 7,954,146 B2 | 5/2011 | Roskind |
| 7,992,210 B2 | 8/2011 | McKenna |
| 8,060,566 B2 | 11/2011 | Appelman |
| 8,117,265 B2 | 2/2012 | Ben-Yoseph |
| 8,180,807 B2 | 5/2012 | Gorti et al. |
| 8,185,638 B2 | 5/2012 | Appelman |
| 8,429,119 B2 | 4/2013 | Gorti |
| 8,560,706 B2 | 10/2013 | Appelman |
| 8,751,440 B2 | 6/2014 | Gorti |
| 8,775,950 B2 | 7/2014 | Valeski |
| RE45,254 E | 11/2014 | Roskind |
| 2001/0002469 A1 | 5/2001 | Bates et al. |
| 2001/0005861 A1 | 6/2001 | Mousseau et al. |
| 2001/0013050 A1 | 8/2001 | Shah |
| 2001/0032246 A1 | 10/2001 | Fardella et al. |
| 2001/0034244 A1 | 10/2001 | Calder et al. |
| 2001/0052019 A1 | 12/2001 | Walters et al. |
| 2002/0015061 A1 | 2/2002 | Maguire |
| 2002/0021307 A1 | 2/2002 | Glenn et al. |
| 2002/0023132 A1 | 2/2002 | Tornabene et al. |
| 2002/0023134 A1 | 2/2002 | Roskowski et al. |
| 2002/0028595 A1 | 3/2002 | Higashi et al. |
| 2002/0042816 A1 | 4/2002 | Bae |
| 2002/0049717 A1 | 4/2002 | Routtenberg et al. |
| 2002/0055975 A1 | 5/2002 | Petrovykh |
| 2002/0056123 A1 | 5/2002 | Liwerant et al. |
| 2002/0059201 A1 | 5/2002 | Work |
| 2002/0065856 A1 | 5/2002 | Kisiel |
| 2002/0065894 A1 | 5/2002 | Dalal et al. |
| 2002/0077080 A1 | 6/2002 | Greene |
| 2002/0083136 A1 | 6/2002 | Whitten, II |
| 2002/0086732 A1 | 7/2002 | Kirmse et al. |
| 2002/0091667 A1 | 7/2002 | Jaipuria et al. |
| 2002/0095464 A1 | 7/2002 | Meek |
| 2002/0103801 A1 | 8/2002 | Lyons |
| 2002/0107928 A1 | 8/2002 | Chalon |
| 2002/0112181 A1 | 8/2002 | Smith |
| 2002/0116463 A1 | 8/2002 | Hart |
| 2002/0116641 A1 | 8/2002 | Mastrianni |
| 2002/0124053 A1 | 9/2002 | Adams et al. |
| 2002/0128033 A1 | 9/2002 | Burgess |
| 2002/0133292 A1 | 9/2002 | Miyaki |
| 2002/0133369 A1 | 9/2002 | Johnson |
| 2002/0147777 A1 | 10/2002 | Hackbarth et al. |
| 2002/0174010 A1 | 11/2002 | Rice, III |
| 2002/0175953 A1 | 11/2002 | Lin |
| 2002/0178161 A1 | 11/2002 | Brezin |
| 2002/0181703 A1 | 12/2002 | Logan et al. |
| 2002/0184089 A1 | 12/2002 | Tsou et al. |
| 2002/0193942 A1 | 12/2002 | Odakura et al. |
| 2002/0199095 A1 | 12/2002 | Bandini et al. |
| 2003/0004855 A1 | 1/2003 | Dutta et al. |
| 2003/0004872 A1 | 1/2003 | Gardi et al. |
| 2003/0009385 A1 | 1/2003 | Tucciarone et al. |
| 2003/0009523 A1 | 1/2003 | Lindskog et al. |
| 2003/0009698 A1 | 1/2003 | Lindeman et al. |
| 2003/0018726 A1 | 1/2003 | Low et al. |
| 2003/0023692 A1 | 1/2003 | Moroo |
| 2003/0023875 A1 | 1/2003 | Hursey et al. |
| 2003/0028524 A1 | 2/2003 | Keskar et al. |
| 2003/0028595 A1 | 2/2003 | Vogt et al. |
| 2003/0037112 A1 | 2/2003 | Fitzpatrick et al. |
| 2003/0043201 A1 | 3/2003 | Abdelhadi et al. |
| 2003/0045272 A1 | 3/2003 | Burr |
| 2003/0046198 A1 | 3/2003 | Knapp et al. |
| 2003/0050916 A1 | 3/2003 | Ortega et al. |
| 2003/0055831 A1 | 3/2003 | Ryan |
| 2003/0065721 A1 | 4/2003 | Roskind |
| 2003/0074454 A1 | 4/2003 | Peck |
| 2003/0078981 A1 | 4/2003 | Harms et al. |
| 2003/0083046 A1 | 5/2003 | Mathis |
| 2003/0084103 A1 | 5/2003 | Weiner et al. |
| 2003/0088554 A1 | 5/2003 | Ryan |
| 2003/0093483 A1 | 5/2003 | Allen et al. |
| 2003/0093580 A1 | 5/2003 | Thomas et al. |
| 2003/0101226 A1 | 5/2003 | Quine |
| 2003/0105822 A1 | 6/2003 | Gusler et al. |
| 2003/0110212 A1 | 6/2003 | Lewis |
| 2003/0131061 A1 | 7/2003 | Newton et al. |
| 2003/0140103 A1 | 7/2003 | Szeto et al. |
| 2003/0158855 A1 | 8/2003 | Farnham et al. |
| 2003/0167324 A1 | 9/2003 | Farnham et al. |
| 2003/0172349 A1 | 9/2003 | Katayama |
| 2003/0182394 A1 | 9/2003 | Ryngler et al. |
| 2003/0187813 A1 | 10/2003 | Goldman et al. |
| 2003/0188263 A1 | 10/2003 | Bates et al. |
| 2003/0191969 A1 | 10/2003 | Katsikas |
| 2003/0200272 A1 | 10/2003 | Campise et al. |
| 2003/0212745 A1 | 11/2003 | Caughey |
| 2003/0212804 A1 | 11/2003 | Hashemi |
| 2003/0225847 A1 | 12/2003 | Heikes et al. |
| 2003/0233416 A1 | 12/2003 | Beyda |
| 2003/0233418 A1 | 12/2003 | Goldman |
| 2003/0236835 A1 | 12/2003 | Levi et al. |
| 2004/0015548 A1 | 1/2004 | Lee |
| 2004/0015553 A1 | 1/2004 | Griffin et al. |
| 2004/0054729 A1 | 3/2004 | Fukuizumi et al. |
| 2004/0054733 A1 | 3/2004 | Weeks |
| 2004/0054735 A1 | 3/2004 | Daniell et al. |
| 2004/0054736 A1 | 3/2004 | Daniell |
| 2004/0056901 A1 | 3/2004 | March et al. |
| 2004/0059781 A1 | 3/2004 | Yoakum et al. |
| 2004/0111261 A1 | 6/2004 | Chaudhari et al. |
| 2004/0117443 A1 | 6/2004 | Barsness |
| 2004/0117451 A1 | 6/2004 | Chung |
| 2004/0122681 A1 | 6/2004 | Ruvolo |
| 2004/0122810 A1 | 6/2004 | Mayer |
| 2004/0122822 A1 | 6/2004 | Thompson et al. |
| 2004/0122855 A1 | 6/2004 | Ruvolo |
| 2004/0122901 A1 | 6/2004 | Sylvain |
| 2004/0128322 A1 | 7/2004 | Nagy |
| 2004/0128356 A1 | 7/2004 | Bernstein et al. |
| 2004/0148275 A1 | 7/2004 | Achlioptas |
| 2004/0153519 A1 | 8/2004 | Stolze |
| 2004/0177119 A1 | 9/2004 | Mason et al. |
| 2004/0179039 A1 | 9/2004 | Blattner et al. |
| 2004/0186738 A1 | 9/2004 | Reisman |
| 2004/0199581 A1 | 10/2004 | Kucharewski et al. |
| 2004/0201624 A1 | 10/2004 | Crawford |
| 2004/0203695 A1 | 10/2004 | Mikan |
| 2004/0205126 A1 | 10/2004 | Ben-Yoseph |
| 2004/0210844 A1 | 10/2004 | Pettinati et al. |
| 2004/0215648 A1 | 10/2004 | Marshall |
| 2004/0215721 A1 | 10/2004 | Szeto et al. |
| 2004/0215793 A1 | 10/2004 | Ryan et al. |
| 2004/0220897 A1 | 11/2004 | Bernhart et al. |
| 2004/0221309 A1 | 11/2004 | Zaner |
| 2004/0243844 A1 | 12/2004 | Adkins |
| 2004/0255122 A1 | 12/2004 | Ingerman et al. |
| 2004/0260762 A1 | 12/2004 | Fish |
| 2005/0004989 A1 | 1/2005 | Satterfield et al. |
| 2005/0015432 A1 | 1/2005 | Cohen |
| 2005/0021750 A1 | 1/2005 | Abrams |
| 2005/0027382 A1 | 2/2005 | Kirmse et al. |
| 2005/0038688 A1 | 2/2005 | Collins et al. |
| 2005/0038856 A1 | 2/2005 | Krishnasamy |
| 2005/0043989 A1 | 2/2005 | Shifrin |
| 2005/0044152 A1 | 2/2005 | Hardy et al. |
| 2005/0050143 A1 | 3/2005 | Guster et al. |
| 2005/0055340 A1 | 3/2005 | Dresden |
| 2005/0055416 A1 | 3/2005 | Heikes et al. |
| 2005/0055450 A1 | 3/2005 | Gang |
| 2005/0060377 A1 | 3/2005 | Lo et al. |

(56) References Cited

U.S. PATENT DOCUMENTS

| | | |
|---|---|---|
| 2005/0076240 A1 | 4/2005 | Appleman |
| 2005/0076241 A1 | 4/2005 | Appelman |
| 2005/0080859 A1 | 4/2005 | Lake |
| 2005/0080863 A1 | 4/2005 | Daniell |
| 2005/0086211 A1 | 4/2005 | Mayer |
| 2005/0086305 A1 | 4/2005 | Koch et al. |
| 2005/0091311 A1 | 4/2005 | Lund et al. |
| 2005/0097170 A1 | 5/2005 | Zhu et al. |
| 2005/0102202 A1 | 5/2005 | Linden et al. |
| 2005/0102257 A1 | 5/2005 | Onyon et al. |
| 2005/0108344 A1 | 5/2005 | Tafoya et al. |
| 2005/0114229 A1 | 5/2005 | Ackley et al. |
| 2005/0117729 A1 | 6/2005 | Reding et al. |
| 2005/0124320 A1 | 6/2005 | Ernst et al. |
| 2005/0153681 A1 | 7/2005 | Hanson |
| 2005/0154913 A1 | 7/2005 | Barriga et al. |
| 2005/0159970 A1 | 7/2005 | Buyukkokten et al. |
| 2005/0159998 A1 | 7/2005 | Buyukkokten et al. |
| 2005/0160144 A1 | 7/2005 | Bhatia |
| 2005/0171799 A1 | 8/2005 | Hull et al. |
| 2005/0177385 A1 | 8/2005 | Hull et al. |
| 2005/0177486 A1 | 8/2005 | Yeager |
| 2005/0188044 A1 | 8/2005 | Fleming, III |
| 2005/0197846 A1 | 9/2005 | Pezaris |
| 2005/0198131 A1 | 9/2005 | Appelman |
| 2005/0198171 A1 | 9/2005 | Landsman et al. |
| 2005/0198172 A1 | 9/2005 | Appelman |
| 2005/0198173 A1 | 9/2005 | Evans |
| 2005/0198268 A1 | 9/2005 | Chandra |
| 2005/0216300 A1 | 9/2005 | Appelman et al. |
| 2005/0246420 A1 | 11/2005 | Little, II |
| 2006/0031366 A1 | 2/2006 | Dolph |
| 2006/0031772 A1 | 2/2006 | Valeski |
| 2006/0036701 A1 | 2/2006 | Bulfer et al. |
| 2006/0075044 A1 | 4/2006 | Fox et al. |
| 2006/0129678 A1 | 6/2006 | Morita |
| 2006/0167991 A1 | 7/2006 | Heikes et al. |
| 2006/0168054 A1 | 7/2006 | Burkhart et al. |
| 2006/0173824 A1 | 8/2006 | Bensky et al. |
| 2006/0173963 A1 | 8/2006 | Roseway et al. |
| 2006/0182248 A1 | 8/2006 | Smith et al. |
| 2006/0190536 A1 | 8/2006 | Strong et al. |
| 2006/0212561 A1 | 9/2006 | Feng |
| 2006/0248573 A1 | 11/2006 | Pannu et al. |
| 2006/0256959 A1 | 11/2006 | Hymes |
| 2006/0277187 A1 | 12/2006 | Roese et al. |
| 2007/0005654 A1 | 1/2007 | Schachar et al. |
| 2007/0047522 A1 | 3/2007 | Jefferson et al. |
| 2007/0050456 A1 | 3/2007 | Vuong et al. |
| 2007/0156664 A1 | 7/2007 | Norton et al. |
| 2007/0208727 A1 | 9/2007 | Saklikar et al. |
| 2007/0208747 A1 | 9/2007 | Puckrin |
| 2007/0239869 A1 | 10/2007 | Raghav et al. |
| 2007/0250566 A1 | 10/2007 | Appelman |
| 2008/0082620 A1 | 4/2008 | Barsness |
| 2008/0115087 A1 | 5/2008 | Rollin et al. |
| 2008/0186164 A1 | 8/2008 | Emigh et al. |
| 2008/0208812 A1 | 8/2008 | Quoc et al. |
| 2008/0228598 A1 | 9/2008 | Leff et al. |
| 2008/0255989 A1 | 10/2008 | Altberg et al. |
| 2009/0030940 A1 | 1/2009 | Brezina et al. |
| 2009/0043844 A1 | 2/2009 | Zimmet et al. |
| 2009/0070306 A1 | 3/2009 | Stroe |
| 2009/0089316 A1 | 4/2009 | Kogan et al. |
| 2009/0100321 A1 | 4/2009 | Singh et al. |
| 2010/0205546 A1 | 8/2010 | Appelman |
| 2010/0325113 A1 | 12/2010 | Valeski |
| 2012/0005078 A1 | 1/2012 | Pitroda et al. |
| 2012/0233269 A1 | 9/2012 | Ben-Yoseph |
| 2013/0066990 A1 | 3/2013 | Ben-Yoseph |
| 2013/0066991 A1 | 3/2013 | Ben-Yoseph |
| 2013/0066992 A1 | 3/2013 | Ben-Yoseph |
| 2013/0080529 A1 | 3/2013 | Appelman |
| 2014/0108571 A1 | 4/2014 | Appelman |
| 2014/0317122 A1 | 10/2014 | Valeski |
| 2014/0317215 A1 | 10/2014 | Isaacs |
| 2014/0324841 A1 | 10/2014 | Isaacs |
| 2014/0324854 A1 | 10/2014 | Isaacs |
| 2014/0324886 A1 | 10/2014 | Valeski |
| 2014/0324887 A1 | 10/2014 | Isaacs |
| 2014/0344381 A1 | 11/2014 | Isaacs |
| 2015/0006549 A1 | 1/2015 | Isaacs |

FOREIGN PATENT DOCUMENTS

| | | |
|---|---|---|
| EP | 0862304 | 9/1998 |
| EP | 1176840 | 1/2002 |
| GB | 2319137 | 5/1998 |
| GB | 2357932 | 4/2001 |
| GB | 2368747 | 8/2002 |
| JP | 2008-314826 | 11/1996 |
| JP | 2000-499001 | 2/2000 |
| JP | 2000-259514 | 9/2000 |
| JP | 2000-284999 | 10/2000 |
| JP | 2001-084320 | 3/2001 |
| WO | WO 97/10558 | 3/1997 |
| WO | WO 97/14234 | 4/1997 |
| WO | WO 97/46955 | 12/1997 |
| WO | WO 98/16045 | 4/1998 |
| WO | WO 98/47270 | 10/1998 |
| WO | WO 99/08434 | 2/1999 |
| WO | WO 99/34628 | 7/1999 |
| WO | WO 99/48011 | 9/1999 |
| WO | WO 00/16201 | 3/2000 |
| WO | WO 00/24154 | 4/2000 |
| WO | WO 00/60809 | 10/2000 |
| WO | WO 00/79396 | 12/2000 |
| WO | WO 01/06748 | 1/2001 |
| WO | WO 01/22258 | 3/2001 |
| WO | WO 01/24036 | 4/2001 |
| WO | WO 01/43357 | 6/2001 |
| WO | WO 01/67787 | 9/2001 |
| WO | WO 01/72020 | 9/2001 |
| WO | WO 01/80079 | 10/2001 |
| WO | WO 02/03216 | 1/2002 |
| WO | WO 02/09437 | 1/2002 |
| WO | WO 02/28046 | 4/2002 |
| WO | WO 02/35781 | 5/2002 |
| WO | WO 02/062039 | 8/2002 |
| WO | WO 02/073886 | 9/2002 |
| WO | WO 2004/028178 | 4/2004 |
| WO | WO 2005/086723 | 9/2005 |
| WO | WO 2005/089286 | 9/2005 |
| WO | WO 2006/068955 | 6/2006 |

OTHER PUBLICATIONS

"Business at Cyberspeed; Brainstorm Becomes Quick Internet Hit," Walker, Jan. 24, 1999, The Washington Post, p. A.Ol, (4 pages).

"Look up contact information from an item," Outlook 2000 SR-l(9.0.04527) Help File, on or before Aug. 10, 2001, p. 1.

"Lotus Instant Messaging Everyplace FAQ," retrieved Apr. 29, 2004 from the World Wide Web: http://www.lotus.comlproducts/product4.nsf/wdocs/249c6f083166cd3e85256d7300714407, pp. 1-3.

"Plaxo—Update Your Address Book," Plaxo Contact Networks, reprinted from http://web.archive.org/web/2003021823363 8/http://www.plaxo.comlprinted on Nov. 5, 2004 (available on Feb. 18, 2003), ( 1 page).

"Reputations Systems," Resnicket al., Dec. 2000, Communications of the ACM, vol. 43, No. 12, pp. 45-48.

"Set up LDAP directory services," Outlook 2000 SR-l (9.0.04527) Help File, on or before Aug. 10, 2001, p. 1.

"Technology Journal: Changing Chat—Instant Messaging is Taking Off, and for Some Users It's Nuzzling Out the Phone," Nick Wingfield, Asian WSJ, Sep. 2000, (5 pages).

"The LP Wireless Messenger," Messenger Documentation, [online]. LP Wireless, Inc., 2002, retrieved on Nov. 2, 2002 from http://www.Ipwireless.com/messengerhelp.htm, pp. 1-7.

"What's new about exchanging information over the Internet," Outlook 2000 SR-l(9.0.0.4527), 1 page,on or before Aug. 10, 2001.

(56) References Cited

OTHER PUBLICATIONS

Archive.org Archived Morpheus 1.9.1 download page on c-net Download.com [online] Jun. 20, 2002, Retrieved from the internet, URL:http://web.archive.org/web/20020803071751/download.com.com/3000-2166-10057840.html>, 2 pages.
Dodgeball.com:: mobile social software, "help: use it", available on Oct. 9, 2004, reprinted from http://web.archive.org/web/20041009201853/www.dodgeball.com/social/help-useit.php Sep. 28, 2005 (2 pgs).
Home-tribe.net, http://washingtondc.tribe.net/message/24434d1b817b-4580-aa42-3bffa15f26a?page=1, (4 pages) available at least as early as Dec. 13, 2004.
Joanna Glasner, "Social Nets Find Friends in VCs", http://www.wired.com/news , Nov. 17, 2003, pp. 1-3.
Online! Feb. 1, 2003, pp. 1-2, XP002297111, Webpage of Slipstick Systems: To add addresses automatically to Microsoft Outlook Contacts, http://web.archive.org/web/20030201082058/http://www.slipstick.com/contacts/addauto.htm>, retrieved on Sep. 17, 2004 the whole document.
U.S. Appl. No. 09/726,912, Sep. 24, 2004, Office Action.
U.S. Appl. No. 10/134,437, Nov. 17, 2009, Supplemental Notice of Allowability.
U.S. Appl. No. 14/858,166, filed Sep. 18, 2015, Isaacs.
U.S. Appl. No. 12/290,827, Jul. 8, 2015, Notice of Allowance.
U.S. Appl. No. 13/618,707, Aug. 5, 2015, Office Action.
U.S. Appl. No. 14/323,601, Jul. 31, 2015, Office Action.
U.S. Appl. No. 13/615,126, Oct. 6, 2014, Office Action.
U.S. Appl. No. 13/615,134, Oct. 8, 2014, Office Action.
U.S. Appl. No. 13/615,142, Oct. 2, 2014, Office Action.
U.S. Appl. No. 14/049,069, Aug. 26, 2014, Notice of Allowance.
U.S. Appl. No. 09/726,912, Sep. 24, 2004, Notice of Allowance.
U.S. Appl. No. 10/747,682, Oct. 11, 2007, Office Action.
U.S. Appl. No. 10/747,682, Apr. 7, 2008, Office Action.
U.S. Appl. No. 10/747,682, Aug. 19, 2008, Office Action.
U.S. Appl. No. 10/747,682, Mar. 18, 2009, Office Action.
U.S. Appl. No. 10/747,682, Nov. 2, 2009, Office Action.
U.S. Appl. No. 10/747,682, Jun. 11, 2010, Office Action.
U.S. Appl. No. 10/747,682, Dec. 2, 2010, Office Action.
U.S. Appl. No. 10/747,682, Oct. 5, 2011, Notice of Allowance.
U.S. Appl. No. 10/979,960, Jan. 31, 2008, Office Action.
U.S. Appl. No. 10/979,960, Sep. 25, 2008, Notice of Allowance.
U.S. Appl. No. 11/945,792, Jun. 21, 2010, Office Action.
U.S. Appl. No. 11/945,792, Dec. 7, 2010, Office Action.
U.S. Appl. No. 11/945,792, Aug. 22, 2011, Office Action.
U.S. Appl. No. 11/945,792, Jan. 31, 2012, Notice of Allowance.
U.S. Appl. No. 12/290,827, Jun. 30, 2010, Office Action.
U.S. Appl. No. 12/290,827, Jan. 5, 2011, Office Action.
U.S. Appl. No. 12/290,827, Sep. 27, 2011, Office Action.
U.S. Appl. No. 12/290,827, Jun. 5, 2015, Notice of Allowance.
U.S. Appl. No. 13/372,371, May 9, 2013, Office Action.
U.S. Appl. No. 13/372,371, Nov. 29, 2013, Office Action.
U.S. Appl. No. 13/372,371, Mar. 26, 2014, Office Action.
U.S. Appl. No. 13/372,371, Jul. 1, 2014, Notice of Allowance.
U.S. Appl. No. 13/443,080, Dec. 31, 2012, Notice of Allowance.
U.S. Appl. No. 13/850,352, Jul. 18, 2013, Office Action.
U.S. Appl. No. 13/850,352, Nov. 27, 2013, Notice of Allowance.
U.S. Appl. No. 60/538,035, filed Jan. 24, 2004, pp. 1-25 "Methods and systems for the display and navigation of a social network".
U.S. Appl. No. 13/618,707, Mar. 4, 2016, Office Action.
U.S. Appl. No. 14/323,601, Apr. 4, 2016, Notice of Allowance.
U.S. Appl. No. 14/327,164, Feb. 26, 2016, Office Action.
U.S. Appl. No. 14/327,202, Mar. 11, 2016, Office Action.
U.S. Appl. No. 14/327,216, Feb. 16, 2016, Office Action.
U.S. Appl. No. 14/328,525, Apr. 11, 2016, Office Action.
U.S. Appl. No. 14/327,226, Feb. 26, 2016, Office Action.
U.S. Appl. No. 14/858,166, Mar. 23, 2016, Office Action.
U.S. Appl. No. 12/290,827, Nov. 4, 2008, Isaacs.
U.S. Appl. No. 13/619,312, Sep. 14, 2012, Appelman.
U.S. Appl. No. 13/619,364, Sep. 14, 2012, Appelman.
U.S. Appl. No. 13/619,397, Sep. 14, 2012, Appelman.
U.S. Appl. No. 14/326,407, Jul. 8, 2014, Roskind.
U.S. Appl. No. 14/327,164, Jul. 9, 2014, Isaacs.
U.S. Appl. No. 14/327,202, Jul. 9, 2014, Isaacs.
U.S. Appl. No. 14/327,216, Jul. 9, 2014, Isaacs.
U.S. Appl. No. 14/327,226, Jul. 9, 2014, Isaacs.
U.S. Appl. No. 14/328,525, Jul. 10, 2014, Isaacs.
"A Reputation System for Peer-to-Peer Networks," Gupta et al., Jun. 1-3, 2003, NOSSDAV'03, Monterey, California, pp. 144-152.
"About File Transfers", AOL Instant Messenger, version 4.3, Help Documentation, available on Jul. 21, 2001, 5 pages.
"About Internet directory services," Outlook 2000 SR-I (9.0.0.4527) Help File, on or before Aug. 10, 2001, p. 1.
"Active Directory Features," [online], Jun. 15, 1999 [retrieved on May 13, 2003]. Retrieved from the Internet http://www.microsoft.corn/windows2000/server/evaluation/features/adlist.asp, pp. 1-4.
"Active Directory Service Overview," [online], Nov. 30, 2001 [retrieved on May 13, 2003]. Retrieved from the Internet <http://www.microsoft.com/windows2000/server/evaluation/business/ad-datasheet.asp>, pp. 1-5.
"Active Directory," [online], [retrieved on May 13, 2003]. Retrieved from the Internet http://www.microsoft.com/windows2000/technologies/directory/AD/default.asp, pp. 1-13.
"AOL Instant Messenger Windows Beta Features", Jun. 24, 1999, 2 pages, AOL Instant Messenger All New Version 2.0, 2 pages, Jun. 24, 1999, What is AOL Instant Messenger, 3 pages, Jun. 24, 1999, Quick Tips for Getting Started, 5 pages, Jun. 24, 1999, Frequently Asked Questions About AOL Instant Messenger, 6 pages, Jun. 24, 1999.
"AOL Instant Messenger", reprinted from http://web.archive.org/web/20010721193059/http://aim.com/ (Way Back Machine—Available on Jul. 21, 2001) on Aug. 26, 2005, 7 pages.
"AOL Instant Messenger All New Version 2.0 Quick Tips for Getting Started," Jun. 24, 1999, 5 pages.
"AOL technology: turning complicated things into engaging services," 1996 Annual Report, 22 pages.
"Benefits of Active Directory in a Windows 2000 Environment," [online], Sep. 20, 2001 [retrieved on May 13, 2003]. Retrieved from the Internet <http://www.microsoft.com/windows2000/server/evaluation/business/adwin2k.asp>, pp. 1-9.
"BestCalls.com Announces the BestCalls Technology Index," Business Wire, Jun. 30, 1999, Business Wire, (2 pages).
"Business at Cyberspeed; Brainstorm Becomes Quick Internet Hit," Walker, Jan. 24, 1999, The Washington Post, p. A.OI, (4 pages).
"CrushParty.com: Help," retrieved Jun. 12, 2002 from the World Wide Web: http://www.crushparty.comlhelp.jsp. (3 pages).
"Degrees of Separation Email Spam Protection", http://www.halfbakery.com, pp. 1-3, Dec. 2001.
"Digital Artifacts for Remembering and Storytelling: Post History and Social Network Fragments," Viegas et al., retrieved from the World Wide Web: http://we.media.mit.edul-fviegas/papers/posthistory_snf.pdf, (10 pages) 2004.
"Directory Integration Can Lower Total Cost of Ownership and Increase Application Functionality," [online], Jul. 27, 1998, [retrieved on May 13, 2003]. Retrieved from the Internet http://www.microsoft.com/presspas/press/1998/July98/ActivDPR.asp, pp. 1-4.
"Enterprise Identity Management with Windows 2000 and Active Directory," [online], 1999 [retrieved on May 13, 2003]. Retrieved from the Internet http://www.microsoft.com/technet/prodtechnol/ad/windows2000/evaluate/w2keims.asp?fra . . . ,pp. 1-16.
"File Transfer Preferences", AOL Instant Messenger, version 5.1, Help Documentation, apparently available as of Nov. 21, 2002, 2 pages.
"Finding Others Online: Reputation Systems for Social Online Spaces," Jensen et al., Apr. 20-25, 2002, CHI, Minneapolis, Minnesota, vol. 4, Issue 1, pp. 447-454.
"GLWebMail 2.0 is released!" http://www.gordano.com; available on Apr. 18, 2001, reprinted from http://web.archive.org/web/20010418153714//http://www.gordano.com, 2 pages.
"Frequently Asked Questions About AOL Instant Messenger," Jun. 24, 1999, 6 pages.

(56) References Cited

OTHER PUBLICATIONS

"Hottie or Nottie? Web Site Voters Let You Know Whether You Sizzle or Fizzle," Marino, Jul. 11, 2001, Florida Times Union, p. c.i., (2 pages).
"Icq.anywhere, Email Features—Email Center—ICQ.com," retrieved Apr. 29, 2004 from the World Wide Web: http://www.icq.cornlemail/popular-features.htrnl, pp. 1-5.
"Idea for Online Networking Brings Two Entrepreneurs Together," Patents: Idea for Online Networking Brings Two EntrepreneursTogether, reprinted from http://www.nytimes.com/2003/12101/technology/Olpatt.htrnl?adxnnl+0&adxnnlx=107029 . . . , printed on Nov. 5, 2004, (2 pages).
"Instant Messaging for Gamers," PC Gamer, May 2004, vol. 11, No. 5, (2 pages).
"Integrating Applications with Windows 2000 and Active Directory,"[online], Oct. 2000 [retrieved on May 8, 2003]. Retrieved from the Internet <http:/www.microsoft.com/technet/prodtechnol/ad/windows2000/evaluate/adappstr.asp?fra . . . >, pp. 1-12.
"Integrating Microsoft Metadirectory Services and Active Directory," [online], Aug. 31, 2000 [retrieved on May 13, 2003]. Retrieved from the Internet <http://www.microsoft.com/windows2000/server/evaluation/news/bulletins/mmsma.asp>, p. 1.
"Look up contact information from an item," Outlook 2000 SR-I (9.0.04527) Help File, on or before Aug. 10, 2001, p. 1.
"Lotus Instant Messaging Everyplace FAQ" retrieved Apr. 29, 2004 from the World Wide Web: http://www.lotus.comlproducts/product4.nsf/wdocs/249c6f083166cd3e85256d7300714407, pp. 1-3.
"New Features in AOL Instant Messenger for Windows v. 2.01 Beta," Apr. 28, 1999, 2 pages.
"Part II: Tasks and Procedures," Active Directory Operations Guide, Microsoft Corporation, Microsoft Windows 2000, Version 1.5, Published Dec. 5, 2002, pp. 1-131.
"PieSpy—Inferring and Visualizing Social Network on IRC," PieSpy Social Network Bot, reprinted from http://lister.linux-srv.anlx.net/piespy printed on Mar. 11, 2004 (18 pages).
"Plaxo," Plaxo, reprinted from http://web.archive.org/web/20041105072256/http://www.plaxo.comlprinted on Nov. 5, 2004 (available on Feb. 14, 2004), (2 pages).
"Plaxo-Update Your Address Book," Plaxo Contact Networks, reprinted from http://web.archive.org/web/2003021823363 8/http://www.plaxo.comlprinted on Nov. 5, 2004 (available on Feb. 18, 2003), ( 1 page).
"Reflections on Friendster, Trust and Intimacy." Danah Boyd. *Ubicomp* 2003, Workshop Application for the Intimate Ubiquitous Computing Workshop. Seattle, WA, Oct. 12-15, 2003.
"Reputation Systems," Resnicket al., Dec. 2000, Communications of the ACM, vol. 43, No. 12, pp. 45-48.
"RIM Road: Software: Internet & Network: Webmessenger RIMJ2ME/Instant Messaging," retrieved Apr. 29, 2004 from the World Wide Web: http://www.rinnod.comisoftware/rimllWebmessenger-RIM-J2ME Instant_-Messaging-20 . . . , (4 pages).
"Set up LDAP directory services," Outlook 2000 SR-I (9.0.04527) Help File, on or before Aug. 10, 2001, p. 1.
"Six Degrees—New Programs Help Companies 'Mine Workers' Relationships for Key Business Prospects," William M. Bulkeley et al., Marketplace, The Wall Street Journal, Aug. 4, 2003, (3 pages).
"Social Network Fragments: An Interactive Tool for Exploring Digital Social Connections." Danah Boyd, Jeff Potter. Sketch as SIGGRAPH 2003. San Diego, California: ACM, Jul. 27-31, 2003.
"Social Networking for Business: Release 0.5," Esther Dyson. Esther Dyson's Monthly Report, Release 1.0, vol. 21, No. 10, Nov. 25, 2003, www.edventure.com (36 pages).
"Social Sites Clicking With Investors," Washingtonpost.com: Social Sites Clicking With Investors, reprinted from http://www.washingtonpost.com/ac2/wp-dyn/A32066-2003NovI2?language=printer printed on Nov. 5, 2004, (2 pages).
"Social Social Networks: Deodorant for the Soul?" Esther Dyson. Esther Dyson's Monthly Report, Release 1.0, vol. 21, No. 11, Dec. 12, 2003, www.edventure.com (36 pages).
"Socialware: Multiagent Systems for Supporting Network Communities," Hattori et al., Mar. 1999, Association for Computing Machinery, Communications of the ACM, vol. 42, Issue 3, pp. 55ff., (6 pages).
"Spoke Builds on Social Networking Patent Portfolio," reprinted from http://www.internetnews.com/ent-news/print.php/3073621 printed on Nov. 5, 2004 (3 pages).
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"Technology Journal: Changing Chat-Instant Messaging is Taking Off, and for Some Users It's Nuzzling Out the Phone," Nick Wingfield, Asian WSJ, Sep. 2000, (5 pages).
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 pages).
"The first Social Software . . . a true Social Adventure," Huminity Social Networking, Chat Software, Create Personal Free Blogs and My Group . . . , reprinted from http://www.huminity.com/ printed on Nov. 5, 2004 (2 pages).
"The Gordano Messaging Server," http://www.gordano.com, Copyright 1994-2003, Gordano, 3 pages.
"Introducing the Gordano Messaging Suite"; http://www.gordano.com; copyright 1994-2003, 2 pages.
"The LP Wireless Messenger," Messenger Documentation, [online]. LP Wireless, Inc., 2002, retrieved on Nov. 2, 2002 from http://www.lpwireless.com/messengerhelp.htm, pp. 1-7.
"Trillian Discussion Forums—HOWTO: Import ICQ 2003a Contact List," retrieved Apr. 29, 2004 from the World Wide Web: http://trillian.cc/forums/showthread.php?s+&threadid=36475, (2 pages).
"Using Active Directory Service," from Chapter 5, Microsoft Windows 2000 Administrator's Pocket Consultant, by William R. Stank (1999). pp. 1-6.
"Welcome to Huminity World of Connections," Huminity-Home, reprinted from http://web.archive.org/web/2003022S131435/www.huminity.comldefault.php?internationa . . . printed on Nov. 5, 2004 (available on Feb. 2, 2003), (1 page).
"What is AOL Instant Messenger," Jun. 24, 1999, 3 pages.
"What's new about exchanging information over the Internet," Outlook 2000 SR-I (9.0.0.4527), 1 page,on or before Aug. 10, 2001.
"Windows 2000 Directory Services," [online] http://www.microsoft.com/windows2000/technologies/directory/default.asp, Nov. 25, 2001, 1 page.
"Windows NetMeeting—Features", [Online], Jun. 17, 1999, X002245623, Retrieved from the Internet: URL:http://www.microsoft.com/windows/NetMeeting/Features/default.ASP>, 8 pages.
"YAHOO! Messenger Makes the World a Little Smaller, More Informed," Jun. 21, 1999, pp. 1-2.
A. Kolcz and J. Alspector, "SVM-based Filtering of E-mail Spam with Content-specific Misclassification Costs," *TextDM'2001 (IEEE ICDM-2001 Workshop on Text Mining)*, San Jose, CA, 2001, pp. 1-14.
Alan Cohen, "Instant Messaging," PC Magazine, PC Labs, Apr. 13, 1999, 2 pages.
America Online Inc., "AOL Instant Messenger", Aug. 29, 2000, Internet: www.aol.corn/aim/, (18 pages).
America Online Inc., New AIM 4.7, Sep. 27, 2001, Internet: http://aim.aol.com, (7 pages).
Anand Ranganathan et al., "ConChat: A Context-Aware Chat Program", Jul.-Sep. 2002, Pervasive Computing, pp. 51-57.
Anonymous: "Push to Talk Services", Internet Document, [Online], p. 1, Retrieved from the internet: URL:http://www.nextel.com/services/directconnect/ptt_overview.shtml, 1 page.
Anonymous: "The Internet—the Advent of New Forms of Communication", Internet Document, [Online], pp. 1-4, Retrieved from the internet URL:http://www.journal.fujitsu.com/248e/e48now.htm, 3 pages.
Archive.org Archived copy of the Morpheus 1.9.1 download page on c-net Download.com [online] Jun. 20, 2002, Retrieved from the

(56) References Cited

OTHER PUBLICATIONS internet, URL:http://web.archive.org/web/20020803071751/download.com.com/3000-2166-10057840.html>, 2 pages.
Australian Office Action of Apr. 7, 2006, App. No. 2002340039 (2 pages).
BuddyGopher ˜We Love Away Messages!, "BuddyGopher simultaneously checks the away messages of your favorite AIM® buddies.", available on Sep. 24, 2004, reprinted from http://web.archive.org/web/200400924104001/http://www.buddygopher.com/ on Sep. 28, 2005 (2 pgs).
BuddyGopher˜About, available on Jul. 13, 2004, reprinted from http://web.archive.org/web/20040713002836/www.buddygopher.com/about.html on Sep. 28, 2005 (3 pgs).
Canadian Office Action from Application Serial No. 2403520 dated Feb. 21, 2005, 2 pages.
Chinese Office Action of Jul. 7, 2006, App. No. 02821420X (5 pages).
AOL Instant Messenger, available on Nov. 21, 2002, reprinted from http://web.archive.org/web/20021121031257/http://aim.com on Aug. 31, 2005 (2 pages).
Bart Massey et al.; "Learning Spam: Simple Techniques for Freely Available Software", Computer Science Dept., Portland, or USA, 2003, pp. 1-14.
CNET Networks Inc., "PopUp Killer", Sep. 13, 2001, Internet: download.cnet.comidownloads/0-10059-100-6932612.html, (3 pages).
Courter et al., "Mastering Microsoft Outlook 2000 Premium Edition", Sybex Inc., Alameda, California, Feb. 2000, pp. 167-169, ISBN 0-7821-2676-6.
Dodgeball.com:: mobile social software, "help: text messaging", available on Oct. 13, 2004, reprinted from http://web.archive.org/web/20041013034241/www.dodgeball.com/social/help-text.php on Sep. 28, 2005 (3 pgs).
Dodgeball.com:: mobile social software, "help: the basics", available on Oct. 9, 2004, reprinted from http://web.archive.org/web/20041009200739/www.dodgeball.com/social/help-basics.php on Sep. 28, 2005 (2 pgs).
Dodgeball.com:: mobile social software, "help: use it", available on Oct. 9, 2004, reprinted from http://web.archive.org/web/20041009201853/www.dodgeball.com/social/help-useit.php on Sep. 28, 2005 (2 pgs).
Dodgeball.com:: mobile social software, "Hook up with friends. Discover what's around you", available on Nov. 30, 2003, reprinted from http://web.archive.org/web/20041130034344/www.dodgeball.com/social/index.php on Sep. 28, 2005 (2 pgs).
Dutta-Roy Amitava, "Virtual Meetings with Desktop Conferencing", IEEE Spectrum, vol. 35, No. 7, Jul. 1, 1998, pp. 47-56 and p. 66.
Ed Bott and Ron Person, Using Windows 95 with Internet Explorer 4.0, Feb. 17, 1995, Que, Special Edition, (21 pages).
Eschenburg, WO laufen sie denn?, Oct. 26, 1998, pp. 92-95.
H. Drucker et al., "Support Vector Machines for Spam Categorization", IEEE Transactions on Neural Networks, vol. 10, No. 5, Sep. 1999, pp. 1048-1054.
Home-tribe.net, http://washingtondc.tribe.net/message/24434d1b817b-4580-aa42-3bffal5f26a?page=1, (4 pages) available at least as early as Dec 13, 2004.
http://www.friendster.com, Dec. 2004, ( 17 pages).
Hudson, Greg; Security in the Internet Message and Presence Protocols, http://mirrors.isc.org/pub/www.watersprings.org/pub/id/draft-hudson-impp-security-00.txt; p. 6, section 7.2.2, first paragraph, p. 6 section 7.2.1, lines 1-2, Nov. 21, 2000.
IBM "Configuring Sametime servers in your Domino environment" May 1, 2000 (14 pages).
Ion Adroutsopoulos et al., "Learning to Filter Spam E-Mail: A Comparison of a Naive Bayesian and a Memory-Based Approach", University of Athens, Sep. 2000, pp. 1-12.

Isaacs, Ellen: "Example UI Spec: Sound Instant Messages", Internet Document, [online], pp. 1-2. Retrieved from the internet: URL:http://www.uidesigns.com/spec/d-sims.html [retrieved on Jun. 26, 2003].
J. Dudley, "Telstra targets Net spammers", news.com.au, Dec. 2, 2003, 2 pages.
J.C. Cannon, "Design Guide for Directory-Enabled Applications,"[online], Apr. 2001 [retrieved on May 13, 2003]. Retrieved from the Internet <http://msdn.microsoft.com/library/en-us/dnactdir/html/ deal.asp?frame=true>, pp. 1-18.
Japanese Office Action of May 12, 2008, App. No. 2003-533140 (7 pages).
Joanna Glasner, "Social Nets Find Friends in VCs", http://www.wired.com/news, Nov. 17, 2003, pp. 1-3.
Joan Morris DiMicco and David R. Millen, "Identity Management: Multiple Presentations of Self in Facebook", Proceeding GROUP '07 Proceedings of the 2007 International ACM Conference on Supporting Group Work, pp. 383-386, ACM.
Julian Byrne, "My Spamblock was thrwarting UCE address culling programs", news.admin.net-abuse.e-mail, Jan. 19, 1997.
Kenrick Mock, Dynamic Email Organization via Relevance Catergories, Intel Corp., Tools with Artificial Intelligence, 1999. Proceedings. 11th IEEE International Conference, pp. 399-405.
Klaus Hartenstein et al., "xhtalk 2.9", Nov. 1992, 6 pages.
Kohda et al., "IMPP: A New Instant Messaging Standard and Its Impact on Internet Business," Dec. 2000, Fujitsu Sci. Tech. J., 36, 2, pp. 147-153.
Leander Kahney, "Will You Buy a Car From This Man?", Oct. 6, 2003, pp. 1-3.
Lotus Sametime 1.5 Jul. 27, 1999 (4 pages).
Mariano, Gwendolyn. ZDNetNews, "Morpheus 1.9 to be unleashed", [online] Jun. 10, 2002. Retrieved from internet URL: http://news.zdnetcom/2100-3513__22-934615.htm, 6 pages.
Mary Beth Marklein, "Student have 'away' with words", Mar. 28, 2004, USA Roday, http://www.usatoday.com/tech/news/2004-03-28-aways-messages-usat-x.htm, all pages.
Matsumoto, Tatsuro et al.: "Chocoa Communicator—A New Communication System based on Awareness and Text Communications --", Fujitsu Sci. Tech. J., 36, 2, pp. 154-161, Dec. 2000.
M. Hearst et al., "Support Vector Machines", IEEE Intelligent Systems, Jul./Aug. 1998, pp. 18-28.
M. Marvin, "Announce: Implementation of E-mail Spam Proposal", news.admin.net-abuse.misc, Aug. 3, 1996, 2 pages.
McKendrick, Joseph, "Internet Call Centers: New Era in Customer Service," Feb. 2002, vol. 10, n2, 5 pages.
Microsoft Corporation, "Active Directory Services Interface in the Microsoft Exchange 5.5 Environment," [online], Nov. 1997 [retrieved on May 13, 2003]. Retrieved from the Internet <http://msdn.microsoft.com/library/en-us/dnactdir/html/msdn_adsiexch.asp?frame=-true>, pp. 1-12.
Microsoft Corporation, "Comparing Microsoft Active Directory to Novell's NDS," [online], Sep. 1998 [retrieved on May 13, 2003]. Retrieved from the Internet <http://msdn.microsoft.com/library/enus/dnactdir/html/msdn_activedirvsnds.asp?frame=true>, pp. 1-17.
Microsoft Corporation, "Introduction to Active Directory Application Mode," Microsoft Windows Server 2003, Aug. 2002, pp. 1-13.
Microsoft Corporation, "Using ADSI, LDAP, and Network Management Functions With Active Directory," [online], Feb. 2002 [retrieved on May 13, 2003]. Retrieved from the Internet <http://msdn.microsoft.com/library/en-us/dnactdir/html/BuildingADApps.asp?framc-truc>, pp. 1-9.
Mike Snider, "America goes online for New Year's bash", USA Today, Jan. 3, 2000, 1 page.
Muller, Nathan, "Dial 1-800-Internet": Feb. 1996, pp. 83-84, 86, 88.
Nardi et al.; Integrating Communication and Information Contactmap; Communication of the ACM; Apr. 2002; vol. 45, No. 4; p. 89-95.
Neo Mai, Ken Neo. "Buying and selling on the internet; [Computimes, 2* Edition]." New Straits Times. Kuala Lumpur: Jun. 28, 2001. p. 53.
Online! Feb. 1,2003, pp. 1-2, XP002297111, Webpage of Slipstick Systems: To add addresses automatically to Microsoft Outlook

(56) References Cited

OTHER PUBLICATIONS

Contacts, http://web.archive.org/web/20030201082058/http://www.slipstick.com/contacts/addauto.htm>, retrieved on Sep. 17, 2004 the whole document.
Part I: Active Directory Operations, Active Directory Operations Guide, Microsoft Corporation, Microsoft Windows 2000, Version 1.5, Published Dec. 5, 2002, pp. 1-187.
Paul Graham, "Better Bayesian Filtering", Jan. 2003, pp. 1-11, http://www.paulgraham.com/better.html.
PowWow (Mar. 1, 2000), Introduction, Retrieved Apr. 3, 2006 from website http://web.archive.org/web/20000301125635/ww2.tribal.com/help/online_docs/h205voic.html.
Pruitt, Scarlet. IDG News Service. "Morpheus Updates Peer-to-Peer Client" [online] Jun. 10, 2002, Retrieved from the internet URL:http://www.pcworld.com/article/id.101736/article.html, 3 pages.
R. Hall, "A Countermeasure to Duplicate-detecting Anti-spam Techniques", AT&T Labs Technical Report 99.9.1, 1999, Abst. and pp. 1-26.
R. Movva & W. Lai, "MSN Messenger Service 1.0 Protocol," Aug. 1999, Internet Draft, http://tools.ietf.org/id!draft-movva-msn-messenger-protocol-oo.txt, 28 pages.
Reichard, K., "AOL, ICQ to Interoperate—But in a Limited Fashion," Oct. 30, 2002, InstantMessagingPlanet, available at www.instantmessagingplanet.com/public/articie.php/1490771.
Ryze home page, www.ryze.com, Dec. 21, 2003, available at http://web.archive.org/web/20031221010006/http://ryze.com, printed Mar. 16, 2005, (13 pages).
S. Hird, "Technical Solutions for Controlling Spam", Proceedings of AUUG2002, Melbourne, Sep. 4-6, 2002, 17 pages.
Satter, Michael, excerpts from the Internet TV with CU-SeeMe, First Edition, including inside Title Page and Copyright Page; "Overview"; "Contents," through pp. xii; Chapter 1, "Introduction to the Internet Videoconferencing and CU-SeeMe," pp. 1-12; Chapter 4, "Hardware," pp. 47-64; Chapter 5, "Software," pp. 65-92: Chapter 6, "CU-SeeMe User's Guide," pp. 93-121; Chapter 9, "Other Videoconferencing Technologies," pp. 201-226; Chapter 10, "What the Future Holds," pp. 227-233; Appendix A, "Troubleshooting Q&A," pp. 235-249; published by Sams.net Publishing, 201 W. 103rd St., Indianapolis, IN 46290, International Standard Book No. 1-57521-006-1, Library of Congress Catalog Card No. 95-70178, copyright 1995.
Stanek, William R., "Working with Active Directory Domains," from Chapter 5, Microsoft Windows 2000 Administrator's Pocket Consultant, (1999). pp. 1-10.
T. Joachims, "Text Categorization with Support Vector Machines: Learning with Many Relevant Features", University of Dortmund, Computer Science Dept., LS-8 Report 23, 1998, 18 pages.
Takashi Yoshino et al., "Namba: Location-Aware Collaboration System for Shopping and Meeting", Aug. 2002, IEEE Transactions on Consumer Electronics, pp. 470-477.
Tribal Voice, PowWow Guided Tour—Step 6, PowWow personal communication. Http://web.archive.org/web/20008170945l6/www.tribal.com/powwow/tour/step6.cfm (Oct. 22, 1999), 2 pages.
Uhara7, "Re. being invisible to all but one person on your list", alt.chat-programs.icq, Feb. 29, 2000.
VisiblePath webpages, www.visiblepath.org, Dec. 3, 2003, available at http://web.archive.org/web/20031203132211http://www.visiblepath.com, printed Mar. 16, 2005, (5 pages).
Wayner, Peter, "Hey Baby, Call Me at My IP Address", Apr. 1996, 3 pages.
WBWE (1998), PowWow 3.6 Brings the Power of Internet Community to the People, Business Wire, 2 pages.
WebmasterWorld.com Inc., "HTML and Browsers", Mar. 5, 2001, Internet: www.webmaster.com/forum21/367.htm, (2 pages).
Yubing Wang, Mark Claypool, Zheng Zuo. Video: An empirical study of realvideo performance across the internet. Proceedings of the 1st ACM SIGCOMM Workshop on the internet measurement IMW'01. Nov. 2001. ACM Press. 15 pages.
Zephyr on Athena (AC-34), http://web.mit.edu/olh//Zephyr/Revision.html, 11 pages, Retrieved on May 17, 2013.
ZeroDegrees home page, www.zerodegrees.com, Jan. 24, 2004, available at http://web.archive.org/web/20040204153037/www.zerodegrees.com/home.htm, printed Mar. 16, 2005, (2 pages).
International Search Report for International Application No. PCT/US03/15715, mailed Aug. 14, 2003, 6 pages.
International Search Report from International Application No. PCT/US03/41499, dated Oct. 27, 2004.
International Search Report and Written Opinion dated Feb. 15, 2006 for International Application No. PCT/US05/07204, (10 pages).
International Search Report and Written Opinion issued for PCT Application No. PCT/US2005/042992, Mar. 6, 2007 914 pages).
International Search Report and Written Opinion issued in International Application No. PCT/US05/45663, dated Apr. 11, 2008.
International Search Report issued in Application Serial No. PCT/US05/08476, dated Oct. 16, 2006, (9 pages).
International Search Report issued in International Application No. EP03731244, dated Aug. 30, 2005, (4 pages).
International Search Report of Apr. 11, 2003, App. No. PCT/US00/35160 (3 pages).
International Search Report of Jan. 9, 2003, App. No. PCT/US02/30730 (4 pages).
International Search Report, Application Serial No. PCT/US2006/018286, dated Oct. 19, 2006, 12 pages.
International Search Report dated Jan. 27, 2005 for International Application No. PCTUS2004/009422, International Filing Date Mar. 26, 2004.
Supplementary European Search Report issued in European Application No. 05857099.5-1238/1836596 PCT/US2005045663, dated Nov. 7, 2008, (5 pages).
Supplementary European Search Report issued in European Application No. EP 05728303, dated Jan. 9, 2009, (4 pages).
European Office Action in Application No. 01954931.0-2414, mailed Jul. 14, 2008, 3 pages.
European Patent Office, Communication of Aug. 30, 2005, App. No. 03731244.1-2416 (PCT/US0315715) 4 pages.
European Patent Office, Communication of Aug. 31, 2009, App. No. 02778374.5-1238, 8 pages.
European Patent Office, Communication of Sep. 5, 2006, App. No. 02778374.5-1238, 4 pages.
Office Action mailed approximately Feb. 29, 2006 for Japanese Patent Application No. 2002-515026 (6 pages).
Office Action of Canadian Application No. 2,462,037, dated Feb. 12, 2009, 8 pages.
Office Action issued in Chinese Application No. 200480013443.9, mailed Mar. 6, 2009, 20 pages, including English translation.
Written Opinion dated Jan. 27, 2005 for International Application No. PCT/US2004/009422, International Filing Date Mar. 26, 2004.
U.S. Appl. No. 09/726,912, Mar. 15, 2004, Office Action.
U.S. Appl. No. 09/810,159, Jul. 6, 2004, Office Action.
U.S. Appl. No. 09/810,159, Feb. 11, 2005, Office Action.
U.S. Appl. No. 09/810,159, Jun. 15, 2005, Office Action.
U.S. Appl. No. 09/810,159, Dec. 2, 2005, Office Action.
U.S. Appl. No. 09/810,159, Apr. 19, 2006, Office Action.
U.S. Appl. No. 09/810,159, Jan. 10, 2008, Examiner's Answer.
U.S. Appl. No. 09/810,159, Jan. 11, 2008, Office Action.
U.S. Appl. No. 09/810,159, Jan. 29, 2010, Office Action.
U.S. Appl. No. 09/843,788, Mar. 30, 2004, Office Action.
U.S. Appl. No. 09/843,788, Dec. 2, 2004, Office Action.
U.S. Appl. No. 09/843,788, Jul. 27, 2005, Office Action.
U.S. Appl. No. 09/843,788, Mar. 28, 2006, Office Action.
U.S. Appl. No. 09/843,788, Jun. 12, 2006, Office Action.
U.S. Appl. No. 09/843,788, Apr. 19, 2007, Office Action.
U.S. Appl. No. 09/843,788, Oct. 31, 2007, Office Action.
U.S. Appl. No. 09/843,788, Sep. 15, 2008, Office Action.
U.S. Appl. No. 09/843,788, May 5, 2010, Office Action.
U.S. Appl. No. 09/911,799, Oct. 5, 2004, Office Action.
U.S. Appl. No. 09/911,799, Apr. 29, 2005, Office Action.
U.S. Appl. No. 09/911,799, Nov. 17, 2005, Office Action.
U.S. Appl. No. 09/911,799, Aug. 11, 2006, Office Action.
U.S. Appl. No. 09/911,799, Jul. 3, 2007, Office Action.

(56) References Cited

OTHER PUBLICATIONS

U.S. Appl. No. 09/911,799, Dec. 1, 2008, Office Action.
U.S. Appl. No. 09/911,799, Mar. 18, 2009, Office Action.
U.S. Appl. No. 09/911,799, Mar. 18, 2010, Office Action.
U.S. Appl. No. 10/134,437, Nov. 1, 2005, Office Action.
U.S. Appl. No. 10/134,437, May 18, 2006, Office Action.
U.S. Appl. No. 10/134,437, Aug. 21, 2006, Advisory Action.
U.S. Appl. No. 10/134,437, Sep. 6, 2007, Miscellaneous Action.
U.S. Appl. No. 10/134,437, Feb. 11, 2008, Office Action.
U.S. Appl. No. 10/134,437, Sep. 18, 2008, Office Action.
U.S. Appl. No. 10/134,437, Mar. 10, 2009, Office Action.
U.S. Appl. No. 10/134,437, Oct. 2, 2009, Notice of Allowance.
U.S. Appl. No. 10/134,437, Sep. 17, 2009, Supplemental Notice of Allowability.
U.S. Appl. No. 10/146,814, May 17, 2002, Examiner's Answer.
U.S. Appl. No. 10/146,814, Sep. 20, 2005, Office Action.
U.S. Appl. No. 10/146,814, May 22, 2006, Office Action.
U.S. Appl. No. 10/146,814, Dec. 11, 2006, Office Action.
U.S. Appl. No. 10/146,814, Jul. 2, 2007, Office Action.
U.S. Appl. No. 10/146,814, Apr. 15, 2008, Office Action.
U.S. Appl. No. 10/146,814, Jan. 12, 2009, Office Action.
U.S. Appl. No. 10/146,814, Mar. 22, 2010, Office Action.
U.S. Appl. No. 10/184,002, Aug. 25, 2005, Office Action.
U.S. Appl. No. 10/184,002, Apr. 20, 2006, Office Action.
U.S. Appl. No. 10/184,002, Jan. 9, 2007, Office Action.
U.S. Appl. No. 10/184,002, Jan. 8, 2008, Office Action.
U.S. Appl. No. 10/184,002, Jul. 24, 2008, Office Action.
U.S. Appl. No. 10/334,056, Nov. 29, 2004, Office Action.
U.S. Appl. No. 10/334,056, Jul. 6, 2005, Office Action.
U.S. Appl. No. 10/334,056, Oct. 31, 2005, Office Action.
U.S. Appl. No. 10/334,056, May 10, 2006, Office Action.
U.S. Appl. No. 10/334,056, May 21, 2007, Office Action.
U.S. Appl. No. 10/334,056, Nov. 5, 2007, Office Action.
U.S. Appl. No. 10/334,056, May 12, 2008, Office Action.
U.S. Appl. No. 10/334,056, Oct. 30, 2008, Office Action.
U.S. Appl. No. 10/334,142, Sep. 7, 2004, Office Action.
U.S. Appl. No. 10/334,142, May 4, 2005, Office Action.
U.S. Appl. No. 10/334,142, Dec. 6, 2005, Office Action.
U.S. Appl. No. 10/334,142, Jul. 14, 2006, Office Action.
U.S. Appl. No. 10/334,142, Dec. 29, 2006, Office Action.
U.S. Appl. No. 10/334,142, Apr. 18, 2007, Notice of Allowance.
U.S. Appl. No. 10/633,636, Oct. 11, 2006, Office Action.
U.S. Appl. No. 10/746,230, Mar. 17, 2009, Office Action.
U.S. Appl. No. 10/746,230, Oct. 5, 2009, Office Action.
U.S. Appl. No. 10/746,230, Apr. 9, 2010, Notice of Allowance.
U.S. Appl. No. 10/746,230, Jan. 6, 2011, Notice of Allowance.
U.S. Appl. No. 10/746,232, Mar. 18, 2009, Office Action.
U.S. Appl. No. 10/746,232, Oct. 30, 2009, Office Action.
U.S. Appl. No. 10/746,232, Jun. 10, 2010, Notice of Allowance.
U.S. Appl. No. 10/746,232, Jan. 18, 2011, Notice of Allowance.
U.S. Appl. No. 10/747,623, Mar. 13, 2007, Office Action.
U.S. Appl. No. 10/747,623, Aug. 21, 2007, Office Action.
U.S. Appl. No. 10/747,623, Nov. 14, 2007, Office Action.
U.S. Appl. No. 10/747,623, Jun. 23, 2008, Office Action.
U.S. Appl. No. 10/747,624, Feb. 26, 2007, Office Action.
U.S. Appl. No. 10/747,624, Jul. 16, 2007, Office Action.
U.S. Appl. No. 10/747,624, Nov. 1, 2007, Office Action.
U.S. Appl. No. 10/747,679, Oct. 2, 2007, Office Action.
U.S. Appl. No. 10/747,679, Apr. 29, 2008, Office Action.
U.S. Appl. No. 10/981,460, Aug. 20, 2008, Office Action.
U.S. Appl. No. 11/015,423, Mar. 2, 2009, Office Action.
U.S. Appl. No. 11/015,424, Mar. 19, 2008, Office Action.
U.S. Appl. No. 11/015,424, Nov. 3, 2008, Office Action.
U.S. Appl. No. 11/015,424, May 1, 2009, Office Action.
U.S. Appl. No. 11/015,424, Oct. 19, 2009, Office Action.
U.S. Appl. No. 11/015,424, Feb. 17, 2010, Notice of Allowance.
U.S. Appl. No. 11/015,476, Mar. 2, 2009, Office Action.
U.S. Appl. No. 11/017,204, Dec. 12, 2007, Office Action.
U.S. Appl. No. 11/017,204, Jun. 23, 2008, Office Action.
U.S. Appl. No. 11/079,522, Oct. 16, 2008, Office Action.
U.S. Appl. No. 11/079,522, Apr. 3, 2009, Office Action.
U.S. Appl. No. 11/150,180, Oct. 2, 2007, Office Action.
U.S. Appl. No. 11/150,180, Apr. 7, 2008, Office Action.
U.S. Appl. No. 11/150,180, Aug. 19, 2009, Office Action.
U.S. Appl. No. 11/237,718, Apr. 2, 2009, Office Action.
U.S. Appl. No. 11/237,718, Oct. 30, 2009, Office Action.
U.S. Appl. No. 11/237,718, Apr. 2, 2010, Notice of Allowance.
U.S. Appl. No. 11/238,110, Nov. 29, 2007, Office Action.
U.S. Appl. No. 11/238,110, Jul. 9, 2008, Office Action.
U.S. Appl. No. 11/238,110, Oct. 9, 2008, Office Action.
U.S. Appl. No. 11/238,129, Nov. 14, 2007, Office Action.
U.S. Appl. No. 11/238,129, May 28, 2008, Office Action.
U.S. Appl. No. 11/238,130, Apr. 14, 2009, Office Action.
U.S. Appl. No. 11/238,130, Nov. 13, 2008, Office Action.
U.S. Appl. No. 11/238,130, Jul. 3, 2008, Office Action.
U.S. Appl. No. 11/238,130, Nov. 24, 2009, Office Action.
U.S. Appl. No. 11/464,816, Apr. 21, 2009, Office Action.
U.S. Appl. No. 11/782,461, Jan. 22, 2008, Office Action.
U.S. Appl. No. 11/782,461, Jul. 17, 2008, Office Action.
U.S. Appl. No. 11/782,461, Oct. 7, 2008, Notice of Allowance.
U.S. Appl. No. 12/336,880, Aug. 4, 2010, Office Action.
U.S. Appl. No. 12/349,161, Jun. 4, 2010, Office Action.
U.S. Appl. No. 12/349,161, Oct. 1, 2010, Office Action.
U.S. Appl. No. 12/349,161, Jan. 24, 2011, Notice of Allowance.
U.S. Appl. No. 12/765,045, Dec. 12, 2011, Office Action.
U.S. Appl. No. 12/765,045, Jul. 19, 2012, Office Action.
U.S. Appl. No. 12/765,045, Dec. 31, 2012, Office Action.
U.S. Appl. No. 12/765,045, Apr. 15, 2013, Office Action.
U.S. Appl. No. 12/765,045, Mar. 7, 2014, Office Action.
U.S. Appl. No. 12/765,045, Aug. 5, 2014, Notice of Allowance.
U.S. Appl. No. 12/852,769, Nov. 14, 2012, Office Action.
U.S. Appl. No. 12/852,769, Jul. 3, 2013, Office Action.
U.S. Appl. No. 12/852,769, Sep. 20, 2013, Notice of Allowance.
U.S. Appl. No. 12/852,769, Aug. 5, 2014, Notice of Allowance.
U.S. Appl. No. 13/093,147, Jul. 19, 2011, Office Action.
U.S. Appl. No. 13/093,147, Jan. 27, 2012, Notice of Allowance.
U.S. Appl. No. 13/472,583, Dec. 6, 2012, Office Action.
U.S. Appl. No. 13/472,583, Jul. 1, 2013, Notice of Allowance.
U.S. Appl. No. 13/620,921, Feb. 15, 2013, Office Action.
U.S. Appl. No. 13/620,921, Aug. 7, 2013, Office Action.
U.S. Appl. No. 13/620,921, Dec. 20, 2013, Office Action.
U.S. Appl. No. 13/620,921, Apr. 25, 2014, Notice of Allowance.
U.S. Appl. No. 13/907,761, Jun. 10, 2014, Office Action.
U.S. Appl. No. 13/907,761, Jul. 16, 2014, Notice of Allowance.
U.S. Appl. No. 14/049,069, May 23, 2014, Office Action.
U.S. Appl. No. 13/618,707, Sep. 12, 2016, Office Action.
U.S. Appl. No. 14/327,164, Aug. 18, 2016, Office Action.
U.S. Appl. No. 14/327,202, Sep. 6, 2016, Office Action.
U.S. Appl. No. 14/327,216, Aug. 17, 2016, Office Action.
U.S. Appl. No. 14/328,525, Oct. 6, 2016, Office Action.
U.S. Appl. No. 14/327,226, Aug. 25, 2016, Notice of Allowance.
U.S. Appl. No. 14/858,166, Aug. 1, 2016, Office Action.
U.S. Appl. No. 13/618,707, Dec. 22, 2016, Office Action.
U.S. Appl. No. 14/327,164, Feb. 8, 2017, Office Action.
U.S. Appl. No. 14/327,202, Mar. 8, 2017, Notice of Allowance.
U.S. Appl. No. 14/327,216, Dec. 16, 2016, Notice of Allowance.
U.S. Appl. No. 14/328,525, Mar. 3, 2017, Office Action.
U.S. Appl. No. 14/858,166, Dec. 27, 2016, Office Action.
U.S. Appl. No. 14/858,166, Apr. 27, 2017, Notice of Allowance.

* cited by examiner

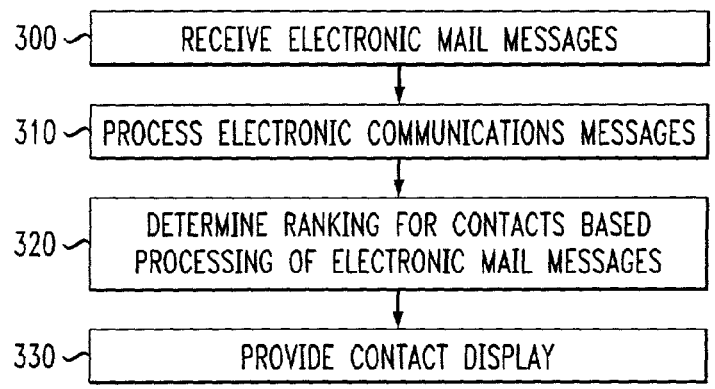
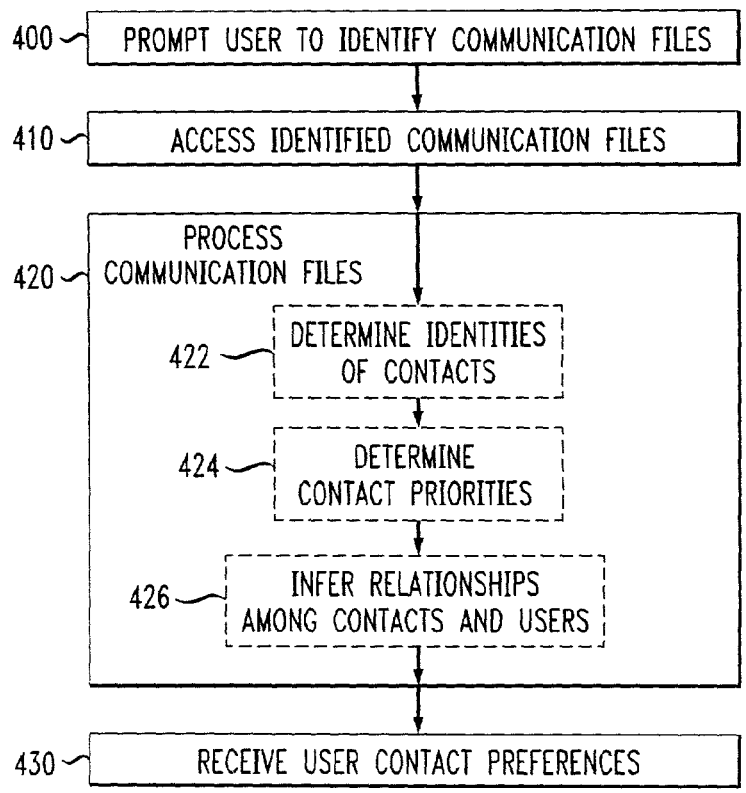

FIG. 7A

```
/* -*-Java-*-
*************************************************************************
*
* File:         MATContactCounts.java
* RCS:          $Header: $
* Description:
* Author:       John Hainsworth
* Created:      Fri Sep 03 15:17:42 1999
* Modified:     Thu Sep 09 16:15:41 1999 (Michael L. Creech) mike@home
* Language:     Java
* Package:      com.att.research.mat.email
* Status:       Experimental (Do Not Distribute)
*
* (c) Copyright 1999, AT&T, all rights reserved.
*
*************************************************************************
*
* Revisions:
*
* Thu Sep 09 16:15:31 1999 (Michael L. Creech) mike@home
*   Added getOldest( ), and getNewest( ).
* Fri Sep 03 15:17:46 1999 (Michael L. Creech) mike@home
*   Made getOrderingValue( ) public.
*************************************************************************
*/
package com.att.research.mat.email;

import java.io.PrintWriter;
import java.io.IOException;
import java.util.Date;

/** Statistics about mail to and from one e-mail address.
 * These statistics are all redundant with respect to the data,
 * so none of them are saved with the data.
 */
```

*FIG. 7A continued*

```
public class MATContactCounts {
  /** Copyright (c) 1999 AT&T labs */
  static public String Copyright = "Copyright (c) 1999 AT&T Labs";

static final private int CountNONE = -1;
  static final private double DCountNONE = -1.0;

static final int FromME = 0;
  static final int FromOTHER = FromME + 1;
  static private final int From_N = FromOTHER + 1;
  static private final String StrFrom[ ] = { "My", " " };

/** seen in an original message */
  static final int KindCOMPOSITION = 0;
  /** seen in a reply message */
  static final int KindREPLY = KindCOMPOSITION + From_N;
  /** seen in a forwarded message */
  static final int KindFORWARD = KindREPLY + FROM_N;
  static private final int Kind_N = KindFORWARD + From_N;
  static private final String StrKind[ ] = { " ", "Repl", "Fwd" };

/** seen in a "To:" header */
  static final int WhereTo = 0;
  /** seen in a "From:" header */
  static final int WhereFROM = WhereTO + Kind_N;
  /** seen in a "Cc:" header */
  static final int WhereCC = WhereFROM + Kind_N;
  /** seen in a "Bcc" header */
  static final int WhereBcc = WhereCC + Kind_N;
  static private final int Where_N = WhereBCC + Kind_N;
  static private final String StrWhere[ ] = { "To", "From", "Cc", "Bcc" };
```

FIG. 7B

```java
// Java will initialize these to 0
private int counts[ ] = new int [Where_N];

Date newest;
Date oldest;

public Date getOldest ( )
  {
    return oldest;
  } public Date getNewest( )
  {
    return newest;
  }

/** @param what Should always be of the form (From?? + Kind?? + Where??) */
void incrementCount(Date d, int what) {
  counts[what]++;
  if (null != d) {
    if (null == newest) {
      oldest = newest = d;
    } else {
      long nms = d.getTime( );
      if (nms > newest.getTime( ) ) {
        newest = d;
      } else if (nms < oldest.getTime( ) ) {
        oldest = d;
      }
    }
  }
}

/** @param what Should always be of the form (From?? + Kind?? + Where??) */
int getCount(int what) {
  return counts[what];
}
```

FIG. 7B continued

```
/** Set all counters to zero. */
void clear( ) {
   int i = 0;
   while (i < Where_N) {
      counts[i++] = 0;
   }
   nonZeroTotal = CountNONE;
   orderingValue = CountNONE;
   oldest = newest = null;
   duration = CountNONE;
   density = CountNONE;
   freshness = DCountNONE;
}

/** Get total number of messages this contact actually appeared in.
 * Since we add To:s to Cc:s and Cc:s to Bcc:s, we just need to count
 * From:s and Bcc:s. */
private int getMessageCount( ) {
   return (counts [FromME    + KindCOMPOSITION + WhereFROM] +
           counts [FromME    + KindREPLY       + WhereFROM] +
           counts [FromME    + KindFORWARD     + WhereFROM] +
           counts [FromOTHER + KindCOMPOSITION + WhereFROM] +
           counts [FromOTHER + KindREPLY       + WhereFROM] +
           counts [FromOTHER + KindFORWARD     + WhereFROM] +
           counts [FromME    + KindCOMPOSITION + WhereBCC]  +
           counts [FromME    + KIndREPLY       + WhereBCC]  +
           counts [FromME    + KindFORWARD     + WhereBCC]  +
           counts [FromOTHER + KindCOMPOSITION + WhereBCC]  +
           counts [FromOTHER + KindREPLY       + WhereBCC]  +
           counts [FromOTHER + KindFORWARD     + WhereBCC]);
}
```

*FIG. 7C*

```
private long duration = CountNONE;
public long getDuration( ) {
  if (CountNONE == duration) {
    if (null != oldest) {
      duration = newest.getTime( ) - oldest.getTime( );
    } else {
      duration = 0;
    }
  }
  return duration;
} private long density = CountNONE;
public long getDensity( ) {
  if (CountNONE == density) {
    long dur = getDuration( );
    if (0 < dur) {
      density = getMessageCount( ) / dur;
    } else {
      density = 0;
    }
  }
  return density;
} private double freshness = DCountNONE;
public double getFreshness( ) {
  if (DCountNONE == freshness ) {
    freshness = ( ( (double) getDensity( ) ) /
                ( (double) ( (new Date( ) ) .getTime( ) - newest.getTime( ) ) ) );
  }
  return freshness;
}
```

FIG. 7C continued

```
private int noneZeroTotal = CountNONE;
int getNonZeroTotal ( ) {
   if (CountNONE == nonZeroTotal) {
      nonZeroTotal = 0;
      int i = 0;
      while (i < Where_N) {
         nonZeroTotal += counts [i];
         i += 1;
      }
   }
   return nonZeroTotal;
} private int orderingValue = CountNONE;

// MLC:
public int getOrderingValue ( ) {
   if (CountNONE == orderingValue) {
      ordeingValue =
         counts [FromME + KindREPLY + WhereTO] * 1000000 +
         counts [FromME + KindCOMPOSITION + WhereTO] * 10000 +
         counts [FromOTHER + KindREPLY + WhereFROM] * 100 +
         counts [FromOTHER + KindCOMPOSITION + WhereFROM] * 100 +
         getNonZeroTotal ( );
   }
   return orderingValue;
}
```

*FIG. 7D*

```
private String print1 (String leader, PrintWriter ps, int what)
    throws IOException {
  if (0 != counts [what]) {
    int iFrom = what % From_N;
    int iKind = (what % Kind_N) / From_N;
    int iWhere = what / Kind_N;
    ps.print (leader+StrFrom[iFrom]+StrKind[iKind]+StrWhere[iWhere]+
            "="+counts[what] );
    leader = " ";
  }
  return leader;
} public void print (PrintWriter ps, int format) throws IOException {
  switch (format) {
  case MATData.FormatANALYSIS:
    String leader = " {";
    int what = 0;
    leader = print1 (leader, ps, FromME + KindREPLY + WhereTO);
    leader = print1 (leader, ps, FromME + KindCOMPOSITION + WhereTO);
    leader = print1 (leader, ps, FromOTHER + KindREPLY + WhereFROM);
    leader = print1 (leader, ps, FromOTHER + KindCOMPOSITION + WhereFROM);
    while (what < Where_N) {
      switch (what) {
      case FromME + KindREPLY + WhereTO:
      case FromME + KindCOMPOSITION + WhereTO:
      case FromOTHER + KindREPLY + WhereFROM:
      case FromOTHER + KindCOMPOSITION + WhereFROM:
        break;
      default:
        leader = print1 (leader, ps, what);
        break;
      }
      what++;
    }
    if (leader.equals(" ") ) {
      ps.print ("}");
    }
    break;
```

*FIG. 7D continued*

```
case MATData.FormatTERMINAL:
   int what2 = 0;
   String leader2 = " {";
   while (what2 < Where_N) {
      leader = print1 (leader2, ps, what2++);
   }
   if (leader2.equals (" ") ) {
     ps.print ("}");
   }
   ps.print (" score="+getOrderingValue ( ) );
   break;
case MATData.FormatDATABASE:
   break;
  }
 }
}
```

FIG. 8A

```
package com.att.research.mat.email;

import com.att.research.mat.utility.UniqueIDs;
import com.att.research.mat.utility.NumberedMember;
import java.util.Enumeration;
import java.io.PrintWriter;
import java.io.IOException
import java.io.StringWriter;
import java.util.Date;

/** A list of contacts that appeared together on a To, Cc, or Bcc line. */ public class MATContactGroup extends UniqueIDs {
  /** Copyright (c) 1999 AT&T Labs */
  static public String Copyright = "Copyright (c) 1999 AT&T Labs";

/** @serial cc not stored */
  private MATContacts cc;

// MLC:
  public MATContacts getMATContacts ( )
    {
      return cc;
    } public MATContactGroup (MATContacts cc) {
    this.cc = cc;
  } public Enumeration elements ( ) { return elements (cc); } public void hideUnimportantMembers (int threshold) {
    Enumeration e = elements (cc);
    while (e.hasMoreElemets ( ) ) {
      ((MATContact) e.nextElement ( ) ) .hideIfUnimportant (threshold);
    }
  }
```

FIG. 8A continued

```
public boolean containsMe ( ) {
    Enumeration e = elements (cc);
    while (e.hasMoreElements ( ) ) {
        if ( ( (MATContact) e.nextElement ( ) ) .isMe ( ) ) {
            return true;
        }
    }
    return false;
}

/** @return Unique id of removed member. */
public int removeMe ( ) {
    int i = 0;
    Enumeration e = elements (cc);
    while (e.hasMoreElements ( ) ) {
        MATContact c = (MATContact) e.nextElement ( );
        if (c.isMe ( ) ) {
            removeElementAt (i);
            return c.getUniqueId ( );
        }
        i++;
    }
    return NumberedMember.IdNONE;
}
```

FIG. 8B

```
public MATContactGroup updateToRemoveMe ( ) {
      int removedMe = removeMe ( );
      if (NumberedMember.IdNONE != removedMe) {
        int others = toMATContactID ( );
        MATContactGroup meGroup = new MATContactGroup(cc);
        meGroup.addElement (removedMe);
        meGroup.addElement (others);
        meGroup.sortIDs ( );
        return meGroup;
      } else {
        return null;
      }
} public int toMATContactID ( ) {
   switch (size( ) ) {
   case 0:
      return NumberedMember.IdNONE;
   case 1:
      return uniqueIdAT (0);
   default:
      int removedMe = removeMe ( );
      if (NumberedMember.IdNONE != removedMe) {
       int others = toMATContactID ( );
       MATContactGroup meGroup = new MATContactGroup(cc);
       meGroup.addElement(removedMe);
       meGroup.addElement(others);
       meGroup.sortIDs ( );
       MATContact c = cc.find (meGroup);
       c.setHidden(true);
       return c.getUniqueID ( );
      } else {
       sortIds ( );
       return cc.find(this).getUniqueId ( );
      }
   }
}
```

FIG. 8B continued

```
/** Calls {@link com.att.research.mat.email.MATContact#incrementCount(Date, int)}
 * for each member. */
void incrementCount(Date d, int what) {
  Enumeration e = elements(cc);
  while (e.hasMoreElements( ) ) {
    ((MATContact)e.nextElement( ) ).incrementCount(d, what);
  }
}

/** Needed by the contact the viewer. */
// This method MUST use cc, and cannot get it as an argument.
// This is the only true reason that cc must be a member of this object.
public String toString( ) {
  StringWriter sw = new StringWriter( );
  PrintWriter ps = new PrintWriter(sw);
  try {
    print(ps, cc, " ", MATData.FormatADDRESS_ONLY);
  } catch (IOException e) {
  }
  return sw.toString( );
}
}
```

SYSTEM AND METHOD FOR ANALYZING COMMUNICATIONS

The present application is a continuation of U.S. patent application Ser. No. 14/323,601, filed Jul. 3, 2014, which is a continuation of U.S. patent application Ser. No. 12/290,827, filed Nov. 4, 2008, which is a continuation of U.S. patent application Ser. No. 10/979,960, filed on Nov. 3, 2004 now issued as U.S. Pat. No. 7,454,470, which is a continuation of U.S. patent application Ser. No. 09/726,912, filed Nov. 30, 2000 now issued as U.S. Pat. No. 6,832,245, which claims the benefit of and priority to U.S. patent application Ser. No. 60/168,242 filed Dec. 1, 1999. Each of the aforementioned patent(s) and application(s) is hereby incorporated by reference in its entirety.

BACKGROUND OF THE INVENTION

The present invention relates generally to communications, and more particularly, to a system and a method for analyzing a user's collection of communications, such as electronic mail messages, telephone messages, voicemails, instant messaging dialogues and telephone logs to determine the identity of contacts within the communications, the relative priority of the contacts within the communications and any relationships between the contacts themselves and between the contacts and the user.

The ever-growing variety of mass communication devices and services such as wireless telephones, pagers, portable computers, personal digital assistants (PDAs), set top boxes, electronic mail, and instant messaging among others, has exponentially increased the number of different types of communications that one may receive on a daily basis. As a result, it has become very difficult to track one's personal and professional contacts since after even a short period of time, one could have hundreds of unique communications, such as electronic mail messages and voicemails to sort through.

Accordingly, it would be desirable to be able to easily analyze a collection of communications, such as electronic mail messages, to determine the identity of one's personal and professional contact, the relative priorities of these contacts and any existing relationship between and among these contacts.

SUMMARY OF THE INVENTION

The invention provides a method for processing user communications to determine identities of contacts within the communications, to prioritize the relative importance of the contacts identified and to establish any relationships between the contacts themselves and between the contacts and the user. In one embodiment, the method includes the steps of receiving a plurality of communication files, wherein the communication files include a plurality of different contacts, reviewing the plurality of communication files to determine contact identities, contact priorities and relationships and providing an analysis of the communication files, wherein the analysis provides the identities of contacts identified in the communication files, the relative importance of contacts relative to one another and any relationships between two or more contacts.

In the present invention, a contact may be refer to an individual person, a company, a group of individual people, an organization, an electronic mail listing or any combination or variations of the aforementioned. Contacts may be related to a user's personal life, workplace or other social networks. Typically, the user will specify a directory, folder or other repository which contains the communications, such as the electronic mail messages to be analyzed. A communications or message processor will receive the communications and from these communications, determine at least the identity of the contacts and their relative priority to one another to the user. For example, contacts which engage in frequent, reciprocal communications with the user are rated or assigned a higher priority than contacts which only engage in one-way communications with the user. Though the sheer number of communications a contact may have with the user is relevant in determining the contact priority, the reciprocal nature of the communications is more indicative as to the importance of the communications.

In one embodiment of the present invention, contacts which are frequently mentioned or "co-mentioned" within communication may also be classified as being related to a similar grouping or network in relation to the user. For example, co-workers who frequently copy each other on electronic mail message may be considered to be part of a single grouping of contacts.

BRIEF DESCRIPTION OF THE DRAWINGS

FIG. 3 illustrates another exemplary method in accordance with the teachings of the present invention.

FIG. 4 illustrates yet another exemplary method in accordance with the teachings of the present invention.

FIGS. 7a-7d illustrate an exemplary code implementation of a sorting method in accordance with the teachings of the present invention.

FIG. 8a-8b illustrate an exemplary code implementation of a clustering method in accordance with the teachings of the present invention.

DETAILED DESCRIPTION OF THE INVENTION

The present invention provides a system and method for analyzing a user's communications, such as electronic mail messages, voicemail messages, instant messages, telephone logs and other such communications. The communications are analyzed to determine the identity of any contacts within the communications, the priority of the contacts within the communications and any inferred relationships between the contacts themselves and between the contact(s) and the user. As used herein, the term contact is used to refer to an individual person, a company, a group of individual people, an organization, an electronic mail listing or a combination of the aforementioned with which a user may communicate and/or receive communications from. For example, a user's colleagues in a work environment may be considered contacts as well as members of a user's family may be considered contacts. Contacts may also be part of and classified into contact groupings, such as related contacts in a family grouping or colleagues in a work grouping.

Figure 1:
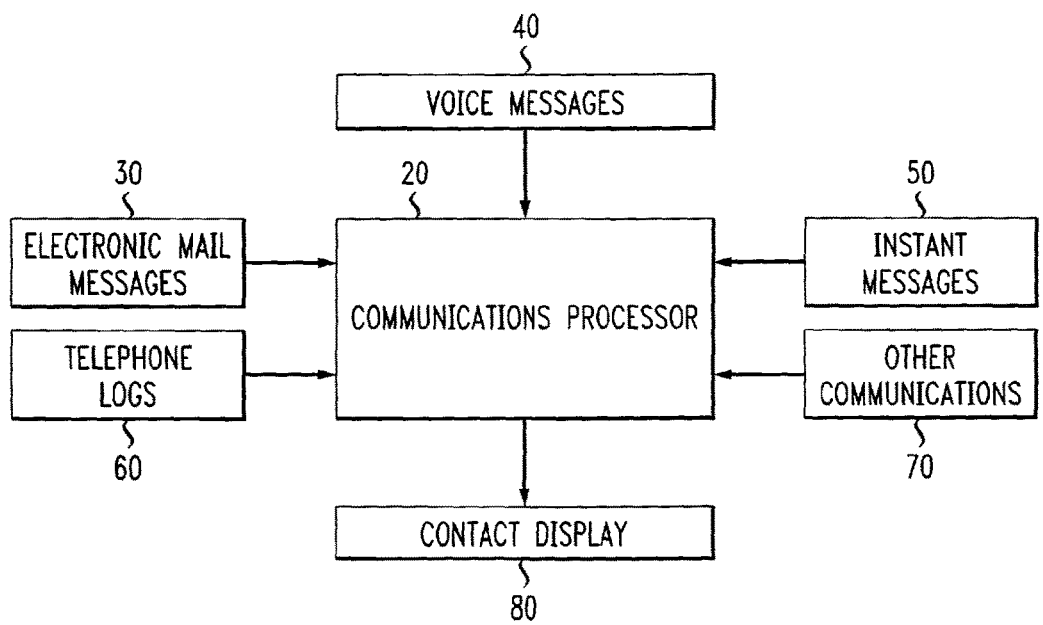
FIG. 1 illustrates an exemplary system in accordance with the teachings of the present invention.

Referring to FIG. 1, a system 10 of the present invention includes a communications processor 20 which analyzes a user's communications, such as the user's electronic mail messages 30, voicemail messages 40, instant messages 50, telephone logs 60 and/or other communications 70 to determine contact identities, priorities and relationships. In a preferred embodiment, the communications processor 20 may be configured as specialized software which implements the methods disclosed here and may be run on a computing device, such as a personal computer, personal digital assistant, wireless phone or other similar device. Such specialized software which implements the methods described herein may also be used in a network device, such as a network server or electronic message server, such as an electronic mail message server. In the present invention, the communications processor 20 will receive and analyze the communications, such as electronic mail messages 20, and provide a contact network display 80 to the user. In one embodiment, the contact display 80 may include a listing of the identified contacts from the communications. Such a listing may be prioritized and arranged in a manner according to the rankings of the contacts as determined from an analysis of the communications, as shown and described later herein.

Figure 2:
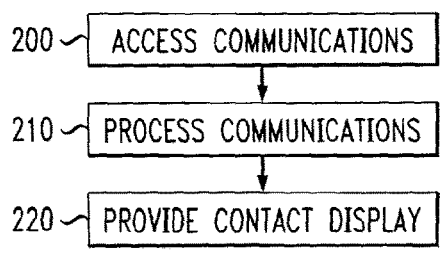
FIG. 2 illustrates an exemplary method in accordance with the teachings of the present invention.

Referring to FIG. 2, a first generalized embodiment of a process for analyzing a user's communications in accordance with the teachings of the present invention is shown. In this embodiment, a plurality of communications are accessed or extracted, step 200, such as by communications processor 20 previously shown in FIG. 1. Once accessed, the communications are processed to determine the relative importance of contacts based on the communications, step 210, such as by the communications processor 20. Once processed, a contact display 220 is provided to the user, step 220, which may include clusters of related contacts. The user is then free to approve and/or modify the contact display as the user sees fit.

Referring to FIG. 3, another embodiment for analyzing a user's communication is shown As shown in FIG. 3, a collection of communication messages, such as electronic mail messages, are received from a user, step 300. In one embodiment of the present invention, the user may specify certain folders, directories, networks or other locations in which these communication messages are stored. These communication messages are processed, step 310, which may include determining the amount of messages from certain specific contacts, an analysis of the message content and/or a determination if the user and the contact have participated in mutual reciprocal communications. Once the messages are processed, a contact ranking is determined based on the processing of the messages, step 320. A contact display of the user's identified contacts is then provided to the user, step 330. In alternative embodiments, other information may be provided to the user via the contact display, such as the priority ratings of each contact and any determined relationships between contacts and the user.

In one embodiment of the present invention, the communications analysis process may be accomplished by initially having a user provide or specify one or more electronic mail folders to process. Once the electronic mail folders are specified, electronic mail message header information from the electronic mail messages are analyzed to determine a relative importance of entities or contacts mentioned in the messages. For electronic mail messages, the header fields, such as the to: from: cc: and bcc: fields may be analyzed to determine which contacts are mentioned or referenced in the messages. In one embodiment, greater priority/weight is attached to contacts who engage in frequent, reciprocal communication (i.e., the user responds to messages from the contact and vice versa), as opposed to if the user sends or receives communications without any reciprocity.

Referring to FIG. 4, another embodiment of the present method for analyzing communications is shown. In this embodiment, a user may be prompted to identify a collection of existing communication files, such as a directory or folder of electronic mail messages, step 400. The identified communication files are accessed, step 410, for example, by accessing a network directory or folder containing the electronic mail messages. Once accessed, the communication files are processed, step 420. Processing the communication files, step 420, may include determining the identities of contacts within the communication files, substep 422; determining the priorities of contacts relative to one another and/or relative to the user, substep 424; and determining any relationships among the contacts and/or the user, substep 426. Once the communication files have been processed, the user's contact preferences are received, step 430. The user's contact preferences may be in form of approvals and disapprovals of the contact identities, priorities and arrangements determined in step 420. For example, if a contact X is determined to be a higher priority contact than a contact Y, the user may override such a determination and assign a higher priority to contact Y even though contact X was previously determined to be of higher priority.

In the present invention, it is contemplated that users can process their communication files, such as their electronic mail messages, via the communications analysis process described herein at any time to create a contact network or incrementally update their contact network display. For example, the message or communications processing may be used to identify new contacts within a user's electronic mail messages and possibly add these new contacts to the user's workspace. Such an updating is best performed at some incremental time interval to ensure that the user's contact network contains the most updated set of contacts.

Figure 5:
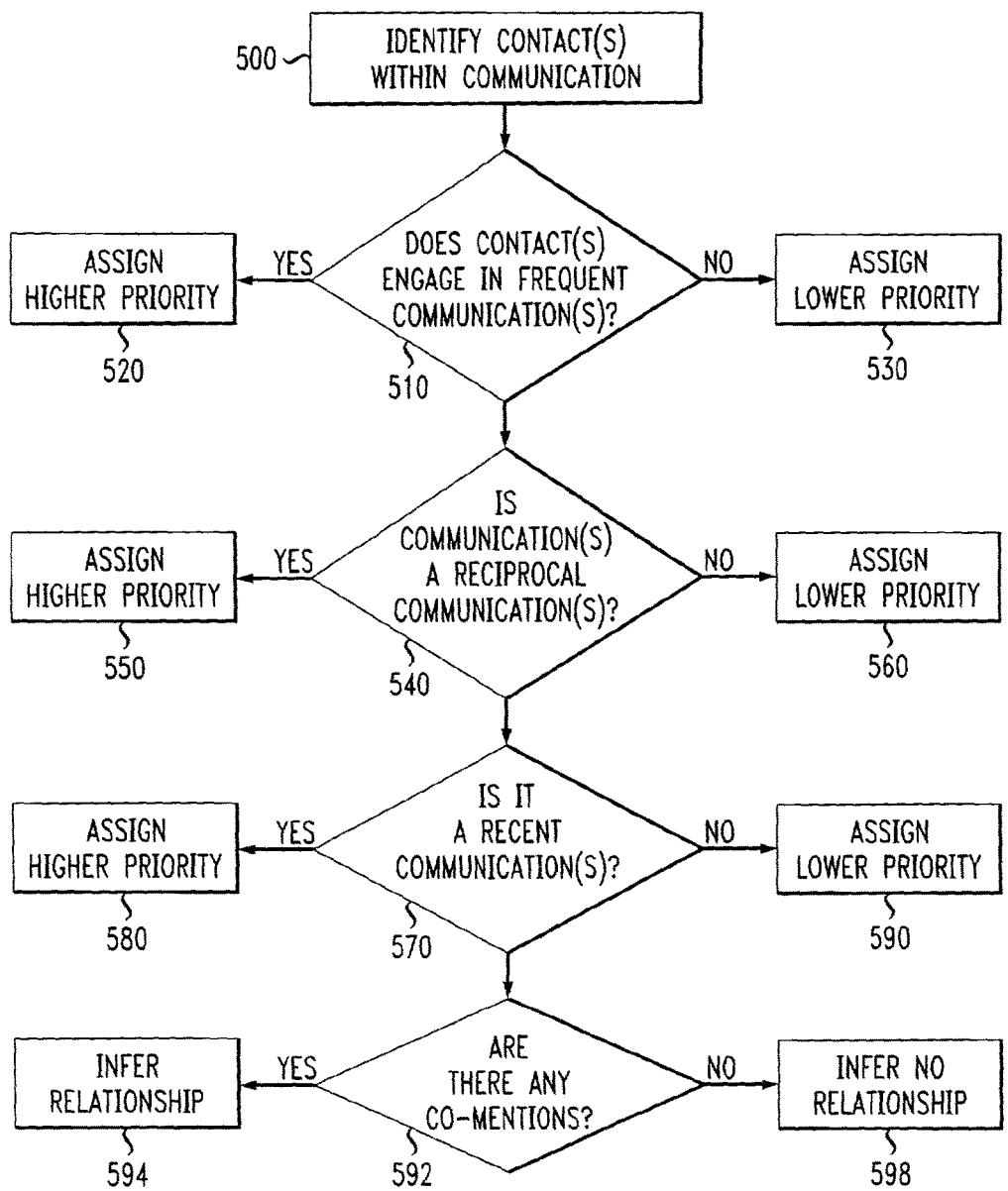
FIG. 5 illustrates still another exemplary method in accordance with the teachings of the present invention.

Referring to FIG. 5, another embodiment of the present method for analyzing a user's communications is shown. In this embodiment, one or more contacts are identified within a communication, step 500, such as be reviewing a header portion of an electronic mail message and/or voicemail message. A determination is made whether the identified contact or contacts have engaged in frequent communications with the user, step 510. Such a determination may be made, for example, by simply counting the number of messages a contact either sent to the user and/or received from the user. If the contact or contacts have engaged in frequent communications with the user, the contact or contacts are assigned a higher priority, step 520. If the contact or contacts have not engaged in frequent communications with the user, the contact or contacts are assigned a relative lower priority, step 530. The threshold for what constitutes frequent communications may be set at any level. For example, the threshold may be set at ten (10) communications, such that if it is determined that a contact engaged in at least ten (10) communications with the user, that contact will then be assigned a higher priority.

Referring again to FIG. 5, another determination is made to decide whether the communications between the user and the contact or contacts are reciprocal communications, e.g., if the communication from the contact is in response to an initial communication from the user, step 540. Reciprocal communications can also be initiated by a contact and thus responses by the user to an initial communication by the contact may also be considered to be reciprocal communications. If the contact or contacts have engaged in reciprocal communications with the user, the contact or contacts are assigned a higher priority, step 550. If the contact or contacts have not engaged in reciprocal communications with the user, the contact or contacts are assigned a relative lower priority, step 560. For example, if a user receives a message from a particular contact, and the user does not reply to the message, the contact may be given a lower priority rating. Additionally, if the user continually receives message from a particular contact and never replies to the message, the contact may be given an even lower priority rating.

Referring again to FIG. 5, a determination may be made based on the recency of the communication, step 570, e.g. how old the communication is relative to other communications being analyzed. Such a determination may be made, for example, by simply processing the date field in an electronic mail message header. If it is determined that the communication is a recent communication, the contact associated with the recent communication may be assigned a higher priority, step 580. If the communication is determined to be an old or a relatively older communication, the contact associated with the communication may be assigned a relative lower priority, step 590. The threshold for what constitutes a recent communication may be set at any level. For example, the threshold may be configured such that any communication that is less than a month old can be considered recent and any communication received that is older than a month may be considered not recent. Furthermore, additional temporal information such as the recency and duration of interactions or rapidity of responses in reciprocal interactions may be analyzed in determining the priority of contacts for a user. For example, contacts which engage in relatively longer duration communications and/or correspond with a user in rapid, reciprocal communications may be rated higher than contacts which do not. For example, if a contact often replies to a message from the user, or the user frequently replies to messages from that particular contact, then it may be inferred that the contact is important to the user. Another strong criterion for inferring importance is if the user often sends messages to the contact. Frequent attempts by the user to target the contact may be some indication of the contact's value. Weaker criteria are that the Contact often sends messages to the user, or is mentioned in (but does not originate) messages to and from the user.

Referring yet again to FIG. 5, another determination is made to decide whether there are any co-mentions in the communications, step 592. As used herein, the term "co-mentions" refers to certain contacts that are referenced or mentioned within the user's communications, such as in their electronic mail messages. For messages or communications involving more than a sender and a single recipient, the group or set of contacts that are mentioned together in the same message will be referenced as "co-mentions". Relations are thus inferred between contacts on the basis of these co-mentions. For example, the more that people are mentioned together, the stronger the inferred relationship, as discussed in more detail later herein.

In one embodiment, the system message processing or communications analysis determines whether or not contacts are mentioned in the header fields of the same electronic mail message. For example, if two people are repeatedly mentioned in the "to:" field of an electronic mail message header from a given contact, then an inference may be made that there is a relationship between that contact and the two co-mentioned people. This information about relationships has two potential benefits: (a) it allows the construction of groups, with straightforward addressing since instead of having to set up electronic mail aliases for groups a user repeatedly communicates with, these groups may be detected automatically and can be used for rapid addressing of messages to multiple individuals; (b) co-mentions may be useful in guiding contact layout, e.g. with co-mentioned contacts being near one another in the initial automatic layout configuration of the user's workspace display. In another embodiment of the present invention, co-mentions may be determined by determining whether a contact routinely forwards a message from another contact to the user or vice versa. In such a case, the contact from which the forwarded message originated, may be considered to be related to the contact which forwarded the message and/or also the user. Referring back to FIG. 5, if two or more contacts have been co-mentioned within the communications, a relationship between the contacts themselves and/or the user is inferred, step 594. If there are no co-mentioning of contacts within the communications, no relationship between the contacts themselves and/or the user is inferred, step 598.

In one embodiment of the present invention, importance ranking of contact(s) may be represented as a linear equation using the following weightings on the above criteria:

$$\text{Importance score} = Kx_1 + Lx_2 + Mx_3 + Nx_4,$$

where
- $x_1$=number of messages the user replies to from the originating contact;
- $x_2$=number of messages the user sends to the contact excluding replies;
- $x_3$=number of reply messages from the contact;
- $x_4$=combined total of messages that are not composed by the user in which the contact is mentioned in the cc or to lines, plus messages from the contact that are not replies;
- K, L, M and N are constant weightings. K applies to messages involving reciprocity and is very large to respect the significance of reciprocal interactions initiated by the user. L is moderately large, based on the intuition that if the user initiates a communication with a contact this suggests that they attach importance to that person. M is also moderately large to respect the importance of contact initiated interactivity. N is small based on the proposition that little value is attached to messages initiated by other people that are not responses, e.g. some of which may be "spam". Similarly, passing mentions of a contact name in messages, to, and from, others may not be highly rated.

Figure 6:
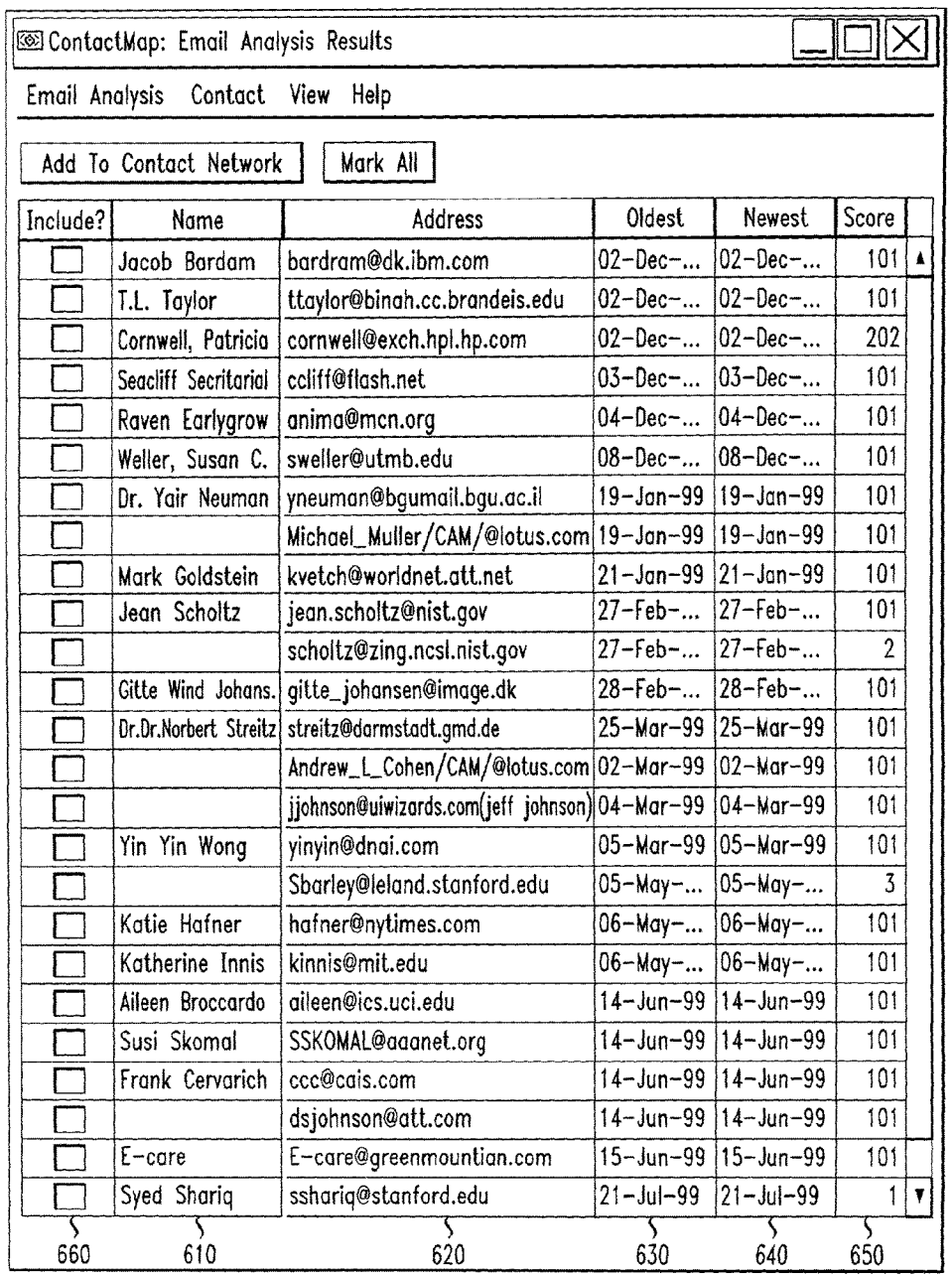
FIG. 6 illustrates an exemplary message processing display in accordance with the teachings of the present invention.

Referring now to FIG. 6, an exemplary contact network display or listing 600 is shown. After the communications analysis or processing as described above is performed, the user may be provided with such a display or listing 600. In one embodiment, the display 600 includes a name section 610, an address section 620, an oldest message date section 630 and a newest message date section 640 and a score section 650. An approval or "include" section 660 may also be provided to the user, which allows the user to include or exclude any number of contacts from the user's contact network.

In the present invention, any number of scoring schemes may be used to rate or prioritize contacts based on the communications processing discussed herein. For example, a 1 to 300 scale may be used, a 1 to 10 scale may also be used as well as an A-Z rating scheme. Rating points or allocations may be provided to a contact in also a number of different manners. For example, a contact may be assigned or awarded a single point for every piece of communication, i.e. electronic mail message, voicemail message, instant message, etc. that the contact participated in with the user.

For example, if a certain contact sent ten electronic mail messages to the user, the contact will be awarded 10 point under this exemplary scoring scheme. The contact's cumulative score may be adjusted by a number of factors, such as by increasing the score if the contact and the user engaged in reciprocal rather than one-way communications. The term "one-way" communications being defined as if the contact sent the user certain communications, but the user never responded to the communications, such as may be the case in terms of "SPAM" or unsolicited electronic mail. Using another exemplary rating or scoring scheme, the contact score may be modified based on certain portions of the communication's content, for example, if the content of a message is determined to have many informal, slang, or otherwise colloquial uses of language in the message content, the contact may be considered to be a personal rather than a business or professional contact and then rated higher or lower accordingly depending on the preferences of the user.

In implementing the teachings of the present invention, it is preferable to develop the system and method herein with an object-oriented structure which may be written in an object-oriented language such as Java. One exemplary implementation may include a set of higher-level user interface components on top of an underlying persistent contact-based data layer and message analysis component. Data objects may be strictly separated from their display to allow multiple display components to display the same underlying data. The Java delegation event model may be used to allow user interface components to easily track changes to underlying data objects. Java object serialization may also be used to persistently store contact information. Referring to FIGS. 7a-7d, an exemplary code listing is shown which may be used to prioritize contacts as discussed herein is shown. Referring to FIGS. 8a-8b, an exemplary code listing is shown which may be used to cluster contact in accordance with the teachings herein.

It will be apparent to those skilled in the art that many changes and substitutions can be made to the system and method described herein without departing from the spirit and scope of the invention as defined by the appended claims. For example, natural language analysis techniques and programs that analyze, for example, electronic mail messages, may be used. Additionally, voice recognition analysis techniques and programs may also be used to analyze the communications, such as voicemail messages. For example, voice recognition analysis may be used to convert voicemail messages into text. The text may then be processed to extract certain contact information from the text, such as contact names, numbers, etc.

The invention claimed is:

1. A method comprising:
   accessing, by at least one computing device comprising a processor, a plurality of electronic communications associated with a user;
   analyzing, by the at least one computing device, the plurality of electronic communications to determine a reciprocity for each contact of a plurality of contacts by identifying a number of previous reciprocal electronic communications between the user and each contact, wherein a reciprocal electronic communication comprises one of:
      an electronic communication reply sent by a contact of the plurality of contacts in response to a prior electronic communication initiated by the user; or
      an electronic communication reply sent by the user in response to a prior electronic communication initiated by a contact of the plurality of contacts; and
   ranking, based on the reciprocity for each contact, the plurality of contacts relative to one another.

2. The method of claim 1, wherein analyzing the plurality of electronic communications to determine a reciprocity for each contact of the plurality of contacts comprises:
   analyzing each of the plurality of electronic communications to determine whether the electronic communication is a reciprocal electronic communication; and
   determining the number of previous reciprocal electronic communications between the user and each contact based on the analysis of each of the plurality of electronic communications.

3. The method of claim 2, wherein determining a reciprocity for each contact of the plurality of contacts comprises determining a frequency of reciprocal electronic communications between the user and each contact of the plurality of contacts.

4. The method of claim 2, further comprising assigning a score to each of the plurality of electronic communications based on whether the electronic communication is a reciprocal electronic communication.

5. The method of claim 4, wherein assigning the score to each of the plurality of electronic communications comprises assigning a higher score to an electronic communication if the electronic communication is a reciprocal electronic communication, and assigning a lower score to an electronic communication if the electronic communication is not a reciprocal electronic communication; and
   determining the reciprocity for each contact of the plurality of contacts based on the score and the number of previous reciprocal electronic communications between the user and the contact.

6. The method of claim 5, further comprising, for each contact of the plurality of contacts, identifying electronic communications from the plurality of electronic communications that are specific to the contact.

7. The method of claim 6, further comprising, for each contact of the plurality of contacts, calculating an importance score based on the identified electronic communications specific to the contact.

8. The method of claim 6, wherein the identified electronic communications specific to the contact each mention the contact or include the contact as a party to the electronic communication.

9. The method of claim 1, further comprising ranking the plurality of contacts relative to one another based on one or more additional factors.

10. The method of claim 9, further comprising assigning a greater weight to the reciprocity for each contact than to the one or more additional factors.

11. The method of claim 1, wherein ranking the plurality of contacts relative to one another comprises:
    identifying one or more contacts that have participated in reciprocal electronic communications with the user;
    identifying one or more contacts that have not participated in reciprocal electronic communications with the user; and
    ranking the one or more contacts that have participated in reciprocal electronic communications with the user higher than the one or more contacts that have not participated in reciprocal electronic communications with the user.

12. The method of claim 1, further comprising providing a listing of the ranked plurality of contacts for presentation to the user.

13. The method of claim 1, further comprising:
identifying one or more additional electronic communications; and
updating the ranking of the plurality of contacts based on an analysis of the one or more additional electronic communications.

14. The method of claim 13, wherein updating the ranking comprises:
identifying, from the one or more additional electronic communications, one or more additional contacts; and
ranking, based on an analysis of the plurality of communications and the one or more additional communications, the plurality of contacts and the one or more additional contacts relative to one another, wherein the analysis of the one or more additional communications comprises determining a reciprocity for each of the one or more additional contacts, wherein the reciprocity for each of the one or more additional contacts is based on identifying a number of previous reciprocal electronic communications between the user and the contact.

15. The method of claim 1, wherein ranking the plurality of contacts relative to one another comprises ranking the plurality of contacts relative to one another with specific respect to the user.

16. The method of claim 1, further comprising providing, for each of the plurality of contacts, a selectable option to add the contact to or remove the contact from a contact network for the user.

17. A system comprising:
at least one processor; and
a non-transitory computer-readable storage medium storing instructions that, when executed by the at least one processor, cause the system to:
access a plurality of electronic communications associated with a user;
analyze the plurality of communications to determine a reciprocity for each contact of a plurality of contacts by identifying a number of previous reciprocal electronic communications between the user and each contact, wherein a reciprocal electronic communication comprises one of:
an electronic communication reply sent by a contact of the plurality of contacts in response to a prior electronic communication initiated by the user; or
an electronic communication reply sent by the user in response to a prior electronic communication initiated by a contact of the plurality of contacts; and
rank, based on the reciprocity for each contact, the plurality of contacts relative to one another.

18. The system of claim 17, wherein analyzing the plurality of electronic communications to determine a reciprocity of the plurality of electronic communications comprises:
analyzing each of the plurality of electronic communications to determine whether the electronic communication is a reciprocal electronic communication; and
determining the number of previous reciprocal electronic communications between the user and each contact based on the analysis of each of the plurality of electronic communications.

19. The system of claim 18, further comprising instructions that, when executed by the at least one processor, further cause the system to:
assign a score to each of the plurality of electronic communications based on whether the electronic communication is a reciprocal electronic communication;
for each of the plurality of contacts, identify electronic communications from the plurality of electronic communications that are specific to the contact; and
for each of the plurality of contacts, calculate an importance score based on the identified electronic communications specific to the contact.

20. The system of claim 17, further comprising instructions that, when executed by the at least one processor, further cause the system to:
rank the plurality of contacts relative to one another based on one or more additional factors; and
assign a greater weight to the reciprocity for each contact than to the one or more additional factors.

21. The system of claim 17, further comprising instructions that, when executed by the at least one processor, further cause the system to:
identify one or more contacts that have participated in reciprocal electronic communications with the user;
identify one or more contacts that have not participated in reciprocal electronic communications with the user; and
rank the one or more contacts that have participated in reciprocal electronic communications with the user higher than the one or more contacts that have not participated in reciprocal electronic communications with the user.

* * * * *